(12) United States Patent
Christopher et al.

(10) Patent No.: US 10,079,691 B2
(45) Date of Patent: Sep. 18, 2018

(54) SYSTEM AND METHOD FOR DEFINING INTERACTIONS BETWEEN INTERNET OF THINGS (IOT) DEVICES USING GRAPHIC USER INTERFACE (GUI) BASED TOOL

(71) Applicant: AMERICAN MEGATRENDS, INC., Norcross, GA (US)

(72) Inventors: Samvinesh Christopher, Suwanee, GA (US); Joseprabu Inbaraj, Suwanee, GA (US); Chandrasekar Rathineswaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 223 days.

(21) Appl. No.: 15/223,177

(22) Filed: Jul. 29, 2016

(65) Prior Publication Data

US 2018/0034655 A1    Feb. 1, 2018

(51) Int. Cl.
*H04L 12/28* (2006.01)
*H04L 29/08* (2006.01)
*G06F 3/048* (2013.01)
*H04L 12/66* (2006.01)
*H04W 12/06* (2009.01)
*H04W 4/70* (2018.01)
*H04L 29/06* (2006.01)
*H04W 12/08* (2009.01)

(52) U.S. Cl.
CPC ............ *H04L 12/283* (2013.01); *G06F 3/048* (2013.01); *H04L 12/66* (2013.01); *H04L 67/125* (2013.01); *H04L 67/28* (2013.01); *H04L 67/36* (2013.01); *H04W 4/70* (2018.02); *H04W 12/06* (2013.01); *H04L 63/101* (2013.01); *H04L 2012/2841* (2013.01); *H04W 12/08* (2013.01)

(58) Field of Classification Search
None
See application file for complete search history.

(56) References Cited

U.S. PATENT DOCUMENTS

2001/0034754 A1\* 10/2001 Elwahab ............. H04L 12/2803
709/201
2008/0184030 A1\* 7/2008 Kelly .................... H04L 9/3268
713/156

(Continued)

*Primary Examiner* — Joshua Joo
(74) *Attorney, Agent, or Firm* — Locke Lord LLP; Tim Tingkang Xia, Esq.

(57) ABSTRACT

Certain aspects direct to systems and methods for defining interactions between internet of things (IoT) devices. The system includes a gateway device, which is communicatively connected to a control device and to multiple IoT devices. The gateway device provides a web user interface (UI), and a user at the control device may operate the web UI to generate a rule command defining an interaction between two IoT devices. The interaction includes an event occurred at a first IoT device, and an action performed at a second IoT device triggered by the event. Upon receiving the rule command, the gateway device creates a corresponding interaction rule. When the gateway device receives a signal from the first IoT device to indicate that the event has occurred, the gateway device generates a triggering command based on the interaction rule, and sends the triggering command to the second IoT device to trigger the action.

23 Claims, 14 Drawing Sheets

(56) References Cited

U.S. PATENT DOCUMENTS

| | | | |
|---|---|---|---|
| 2013/0103221 A1* | 4/2013 | Raman | G06F 9/5094 |
| | | | 700/295 |
| 2015/0019710 A1* | 1/2015 | Shaashua | H04W 4/70 |
| | | | 709/224 |
| 2015/0249672 A1* | 9/2015 | Burns | H04L 12/66 |
| | | | 726/4 |
| 2016/0226732 A1* | 8/2016 | Kim | H04L 12/2807 |
| 2017/0041388 A1* | 2/2017 | Tal | G06F 17/2705 |
| 2017/0093915 A1* | 3/2017 | Ellis | H04L 63/20 |
| 2017/0374560 A1* | 12/2017 | Judge | H04W 4/33 |
| 2018/0007058 A1* | 1/2018 | Zou | H04L 63/1408 |

\* cited by examiner

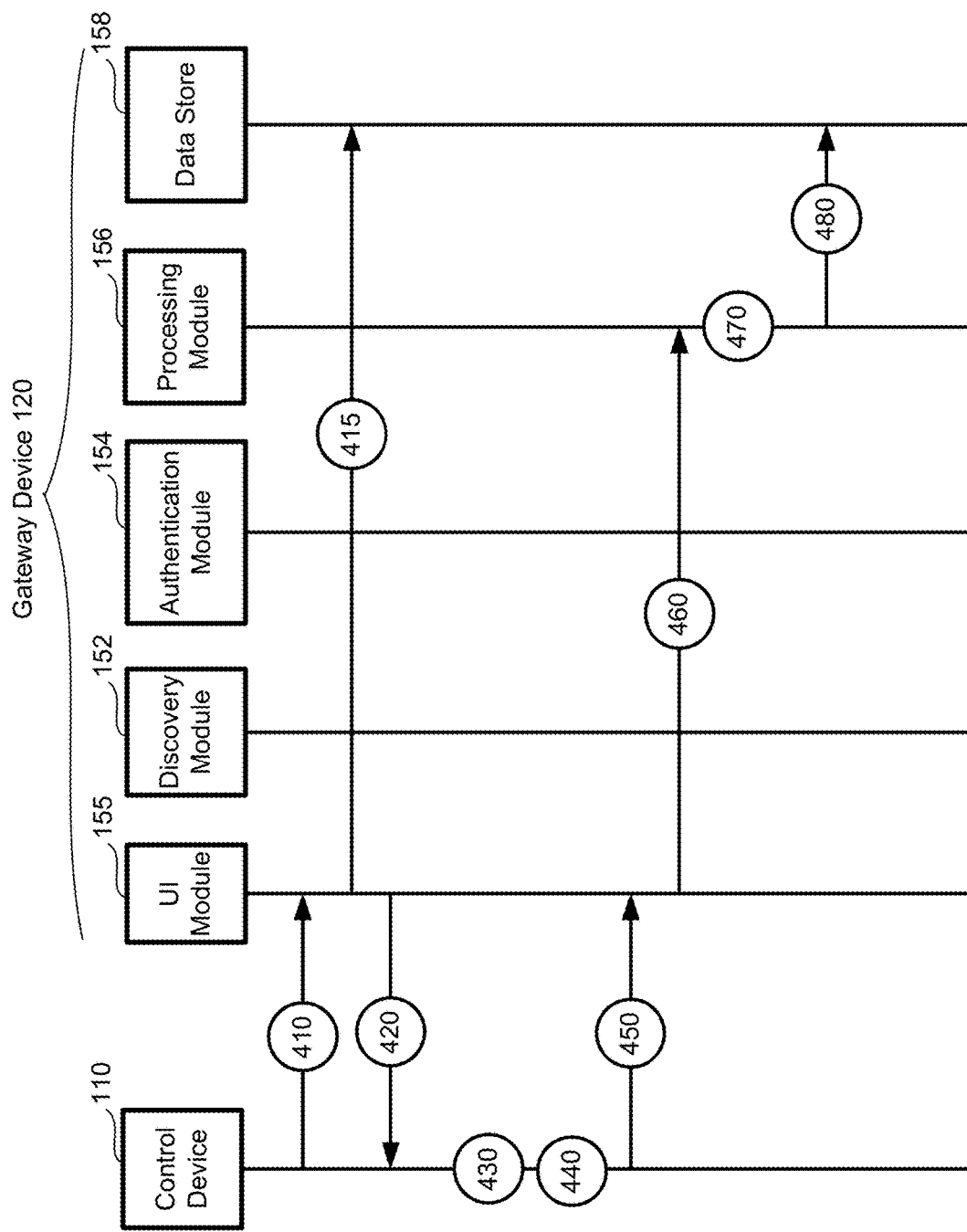

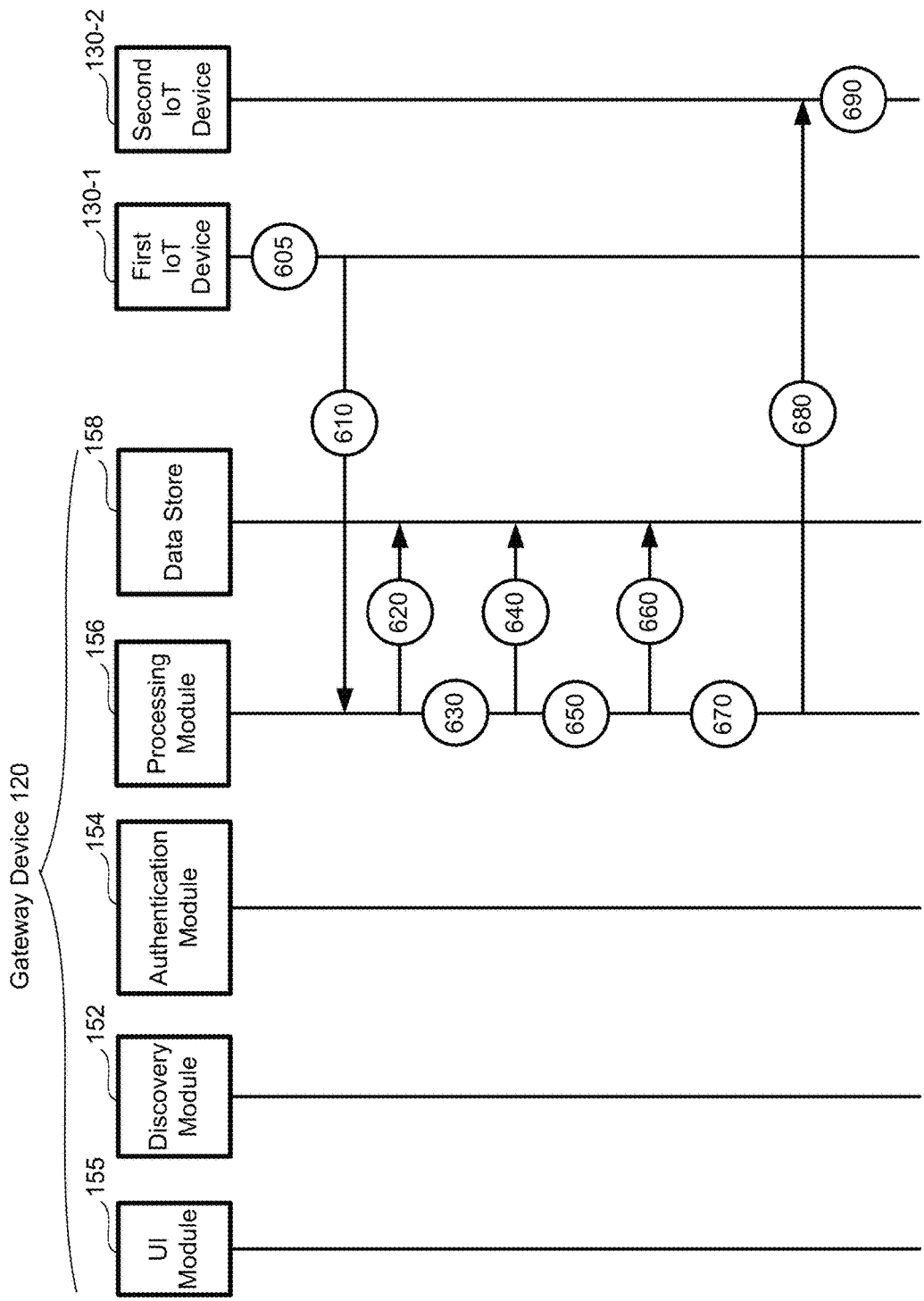

SYSTEM AND METHOD FOR DEFINING INTERACTIONS BETWEEN INTERNET OF THINGS (IOT) DEVICES USING GRAPHIC USER INTERFACE (GUI) BASED TOOL

CROSS-REFERENCE TO RELATED PATENT APPLICATION

This application relates to co-pending U.S. patent application Ser. No. 15/223,146, entitled "SYSTEM AND METHOD FOR CONTROLLING HETEROGENEOUS INTERNET OF THINGS (IOT) DEVICES USING SINGLE APPLICATION" and filed on Jul. 29, 2016. The entire content of the above identified applications are incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to internet of things (IoT) technology, and more particularly to systems and methods for defining interactions between IoT devices using graphic user interface (GUI) based tool.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internet of things (IoT) is a relatively new developing technology. Normally, to access and control the IoT devices, an end user may use a mobile device installed with a mobile application (hereinafter the "app"). The actual power of using IoT devices lies upon the fact that the IoT device may interact with each other and do actions based on events. Some IoT vendors provide tools for interaction between the IoT devices they manufacture. However, IoT devices do not have any common standards between vendors. If a user has multiple IoT devices from different vendors, there is no simple tool for the end user to define the interactions between these IoT devices.

Therefore, an unaddressed need exists in the art to address the aforementioned deficiencies and inadequacies.

SUMMARY

Certain aspects of the disclosure direct to a system, which includes a control device and a gateway device. The gateway device is communicatively connected to the control device and a plurality of authenticated internet of things (IoT) devices, wherein each of the control device and the authenticated IoT devices is communicatively connected to the gateway device through a corresponding network under a corresponding protocol, and the authenticated IoT devices include a first IoT device and a second IoT device. In certain embodiments, the gateway device includes a processor and a storage device storing computer executable code. The computer executable code, when executed at the processor, is configured to: provide a web user interface (UI) for the control device, wherein the web UI is configured to display information of the authenticated IoT devices at the control device; receive, through the web UI from the control device, a rule command to define an interaction between the first IoT device and the second IoT device, wherein the interaction includes an event occurred at the first IoT device, and an action performed at the second IoT device triggered by the event at the first IoT device; in response to the rule command, create an interaction rule for the interaction between the first IoT device and the second IoT device based on the rule command; receive a signal from the first IoT device to indicate the event, and determine, based on the signal, that the event has occurred at the first IoT device; and in response to determining that the event has occurred at the first IoT device, generate, based on the interaction rule for the interaction between the first IoT device and the second IoT device, a triggering command; and send the triggering command to the second IoT device through the corresponding network under the corresponding protocol for the second IoT device to trigger the action at the second IoT device.

In certain embodiments, the computer executable code includes: a data store storing information of the control device, configuration data of the authenticated IoT devices, the interaction rule for the interaction between the first IoT device and the second IoT device, and a plurality of application program interfaces (APIs), wherein: for each of the authenticated IoT devices, a corresponding API specific for the authenticated IoT device is selected from the APIs, and the configuration data includes information of the corresponding API, the corresponding network and the corresponding protocol specific for the authenticated IoT device; the configuration data of the first IoT device further includes information of the event; and the configuration data of the second IoT device further includes information of the action; a UI module, configured to provide the web UI, and receive the rule command from the control device; and a processing module, configured to: create the interaction rule for the interaction between the first IoT device and the second IoT device based on the rule command, and store the interaction rule in the data store; receive the signal from the first IoT device, and determine, based on the signal, that the event has occurred at the first IoT device; and in response to determining that the event has occurred at the first IoT device, generate, based on the interaction rule for the interaction between the first IoT device and the second IoT device, the triggering command, and send the triggering command to the second IoT device through the corresponding network under the corresponding protocol for the second IoT device to trigger the action at the second IoT device.

In certain embodiments, the processing module is configured to receive the signal from the first IoT device, and determine, based on the signal, that the event has occurred at the first IoT device by: receiving the signal from the first IoT device through the corresponding network under the corresponding protocol for the first IoT device; retrieving the configuration data of the first IoT device; selecting, based on the configuration data of the first IoT device, the corresponding API specific for the first IoT device; and processing the signal using the corresponding API specific for the first IoT device to determine that the event has occurred at the first IoT device.

In certain embodiments, the processing module is configured to generate the trigger command by: retrieving the interaction rule for the interaction between the first IoT device and the second IoT device; determining, based on the interaction rule, the second IoT device; retrieving the configuration data of the second IoT device; selecting, based on the configuration data of the second IoT device, the corresponding API specific for the second IoT device, and determine the corresponding network and the corresponding protocol for the second IoT device; and generating the triggering command using the corresponding API specific for the second IoT device based on the interaction rule.

In certain embodiments, the control device is a mobile device storing an IoT control application which, when executed at a processor of the mobile device, is configured to: request the web UI from the gateway device; in response to receiving the web UI, display the information of the authenticated IoT devices through the web UI; receive inputs corresponding to the first IoT device, the event occurred at the first IoT device, the second IoT device, and the action performed at the second IoT device; generate the rule command based on the inputs; and send the rule command to the gateway device.

In certain embodiments, the web UI is a graphic UI (GUI), and each of the first IoT device, the event occurred at the first IoT device, the second IoT device, and the action performed at the second IoT device is displayed as an icon in the GUI.

In certain embodiments, the computer executable code further includes: a discovery module configured to perform at least one discovery operation for available IoT devices; and an authentication module configured to: in response to discovery of a new IoT device, generate an notification corresponding to the new IoT device being discovered, and send the notification to the control device; receive, from the control device, an approval command to approve authentication of the new IoT device being discovered, or a rejection command to reject authentication of the new IoT device being discovered; and in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices.

In certain embodiments, the IoT control application, when executed at the processor of the mobile device, is further configured to: receive the notification corresponding to the new IoT device being discovered from the gateway device; display, based on the notification, information corresponding to the new IoT device being discovered on the user interface; and in response to receiving an input corresponding to the new IoT device to approve or reject the authentication of the new IoT device being discovered, generate, based on the input, the approval command or the rejection command, and send the approval command or the rejection command to the gateway device.

In certain embodiments, the gateway device further includes a plurality of network interfaces, wherein each of the network interfaces is operational under one of the corresponding protocols for the control device and the authenticated IoT devices.

In certain embodiments, the corresponding network for the control device is a Wi-Fi network.

Certain aspects of the disclosure direct to a method for defining interactions between heterogeneous IoT devices from a control device, which includes: providing a gateway device communicatively connected to the control device and a plurality of authenticated IoT devices, wherein each of the authenticated IoT devices is communicatively connected to the gateway device through a corresponding network under a corresponding protocol, and the authenticated IoT devices include a first IoT device and a second IoT device; providing, by the gateway device, a web UI for the control device, wherein the web UI is configured to display information of the authenticated IoT devices at the control device; receiving, by the gateway device, a rule command to define an interaction between the first IoT device and the second IoT device through the web UI from the control device, a first command from the control device through the first network under the first protocol, wherein the interaction includes an event occurred at the first IoT device, and an action performed at the second IoT device triggered by the event at the first IoT device; in response to the rule command, creating, by the gateway device, an interaction rule for the interaction between the first IoT device and the second IoT device based on the rule command; receiving, by the gateway device, a signal from the first IoT device to indicate the event, and determine, based on the signal, that the event has occurred at the first IoT device; and in response to determining that the event has occurred at the first IoT device, generating, by the gateway device, a triggering command based on the interaction rule for the interaction between the first IoT device and the second IoT device; and sending, by the gateway device the triggering command to the second IoT device through the corresponding network under the corresponding protocol for the second IoT device to trigger the action at the second IoT device.

In certain embodiments, the gateway device includes a data store storing information of the control device, configuration data of the authenticated IoT devices, the interaction rule for the interaction between the first IoT device and the second IoT device, and a plurality of application program interfaces (APIs), wherein: for each of the authenticated IoT devices, a corresponding API specific for the authenticated IoT device is selected from the APIs, and the configuration data includes information of the corresponding API, the corresponding network and the corresponding protocol specific for the authenticated IoT device; the configuration data of the first IoT device further includes information of the event; and the configuration data of the second IoT device further includes information of the action.

In certain embodiments, the gateway device is configured to receive the signal from the first IoT device, and determine, based on the signal, that the event has occurred at the first IoT device by: receiving the signal from the first IoT device through the corresponding network under the corresponding protocol for the first IoT device; retrieving the configuration data of the first IoT device; selecting, based on the configuration data of the first IoT device, the corresponding API specific for the first IoT device; and processing the signal using the corresponding API specific for the first IoT device to determine that the event has occurred at the first IoT device.

In certain embodiments, the gateway device is configured to generate the trigger command by: retrieving the interaction rule for the interaction between the first IoT device and the second IoT device; determining, based on the interaction rule, the second IoT device; retrieving the configuration data of the second IoT device; selecting, based on the configuration data of the second IoT device, the corresponding API specific for the second IoT device, and determining the corresponding network and the corresponding protocol for the second IoT device; and generating the triggering command using the corresponding API specific for the second IoT device based on the interaction rule. In certain embodiments, the control device is a mobile device storing an IoT control application which, when executed at a processor of the mobile device, is configured to: request the web UI from the gateway device; in response to receiving the web UI, display the information of the authenticated IoT devices through the web UI; receive inputs corresponding to the first IoT device, the event occurred at the first IoT device, the second IoT device, and the action performed at the second IoT device; generate the rule command based on the inputs; and send the rule command to the gateway device.

In certain embodiments, the web UI is a GUI, and each of the first IoT device, the event occurred at the first IoT device, the second IoT device, and the action performed at the second IoT device is displayed as an icon in the GUI.

Certain aspects of the disclosure direct to a non-transitory computer readable medium storing computer executable code. In certain embodiments, the computer executable code, when executed at a processor of a gateway device, is configured to: provide a web UI for a control device, wherein the gateway device is communicatively connected to the control device and a plurality of authenticated IoT devices through a corresponding network under a corresponding protocol, the authenticated IoT devices comprise a first IoT device and a second IoT device, and the web UI is configured to display information of the authenticated IoT devices at the control device; receive, through the web UI from the control device, a rule command to define an interaction between the first IoT device and the second IoT device, wherein the interaction comprises an event occurred at the first IoT device, and an action performed at the second IoT device triggered by the event at the first IoT device; in response to the rule command, create an interaction rule for the interaction between the first IoT device and the second IoT device based on the rule command; receive a signal from the first IoT device to indicate the event, and determine, based on the signal, that the event has occurred at the first IoT device; and in response to determining that the event has occurred at the first IoT device, generate, based on the interaction rule for the interaction between the first IoT device and the second IoT device, a triggering command; and send the triggering command to the second IoT device through the corresponding network under the corresponding protocol for the second IoT device to trigger the action at the second IoT device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 4 depicts a flowchart showing a method for defining an interaction between a first IoT device and a second IoT device according to certain embodiments of the present disclosure.

FIG. 6 depicts a flowchart showing a method for operation of the interaction between two IoT devices based on the interaction rule according to certain embodiments of the present disclosure.

DETAILED DESCRIPTION

Figure 1:
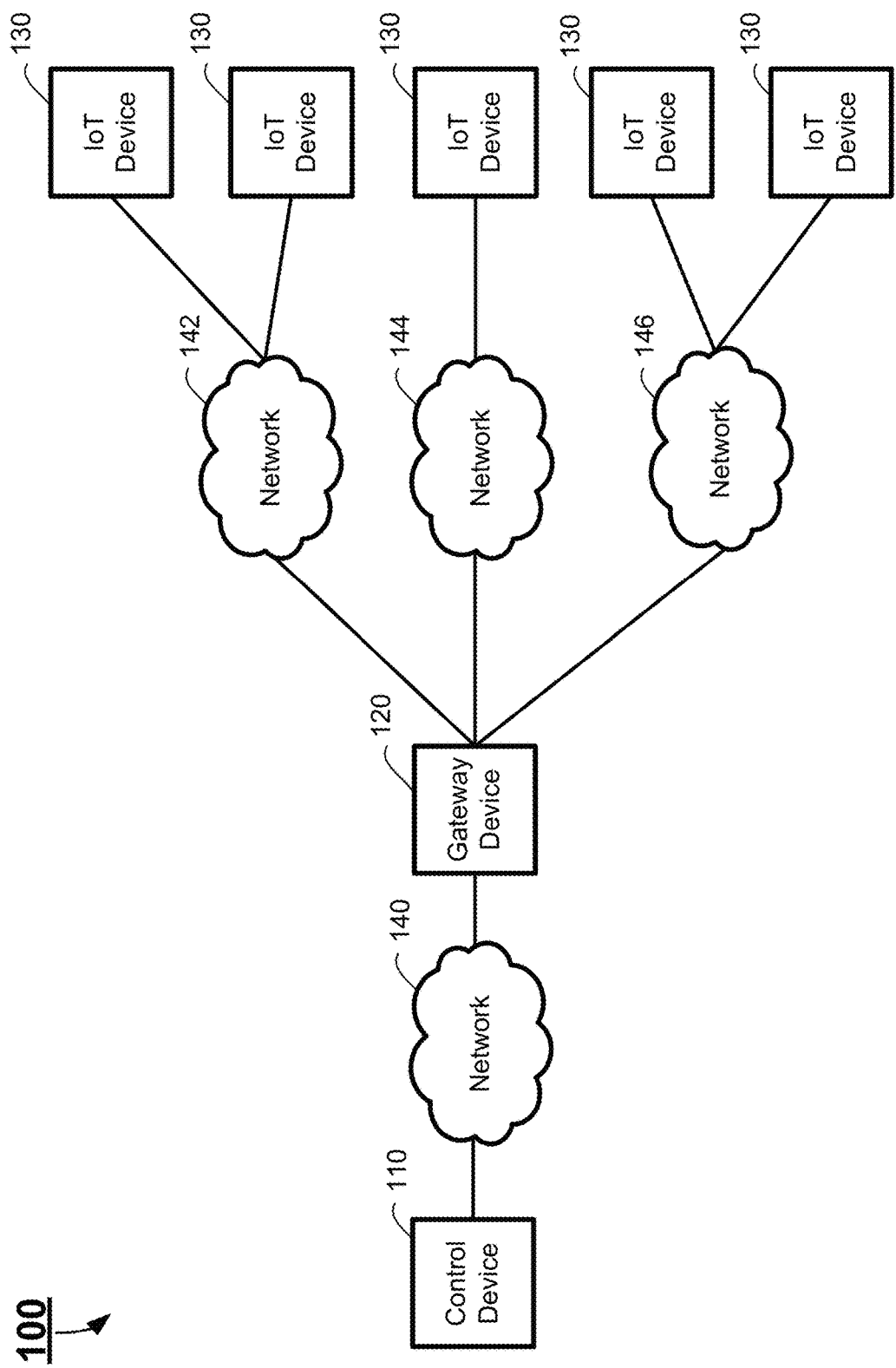
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on IoT devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for defining interactions between IoT devices using GUI based tool. As discussed above, IoT devices do not have any common standards, and every IoT vendor has its own proprietary implementation of the IoT device. With a variety of vendors and IoT devices, the end user does not have any simple tool to define and implement interactions between IoT devices from different vendors. Specifically, most IoT vendors publish their application program interfaces (APIs), which may include information of protocols, functions, access methods and authentication mechanisms for the IoT devices. Some of the APIs can directly act on the devices and some of the APIs can act with the devices via a cloud network. Two entities can be separated from the API, including events and actions. An interaction normally involves an event and an action. In certain embodiments, some of the IoT devices may provide both events and actions. For example, an IoT device may be a thermostat which has a switch on a heating, ventilating and air conditioning (HVAC) system, in which the event of the thermostat is reading a temperature, and the action of the thermostat is switching on or off the HVAC. In certain embodiments, some of the IoT devices provide only one or more events, and some other IoT devices provide only one or more actions. For example, the IoT device may be a door sensor, which can only generate events (sensing the door opening or closing). The interaction between two IoT devices may be defined, for example, as "if an event X happens on IoT device #1, perform an action on the IoT device #2." Specifying the events and actions for the interactions should be easy for end users. If a GUI for the IoT devices is provided, the end users may visually see the IoT devices on the GUI, and may perform drag and drop functions the IoT devices to connect them with events and actions. In this way, the end users may define interactions between the IoT devices using the GUI easily.

In certain embodiments, the GUI may be a HTML5 web based interface, which is provided by a web server running on a gateway device. HTML5 is the fifth and current version of the HyperText Markup Language (HTML) standard, which is a markup language used for structuring and presenting content on the World Wide Web. The gateway device functions as a central hub node in the IoT network, which may be used to access the IoT devices by receiving the events and controlling the actions of the IoT devices. In certain embodiments, the gateway device stores the information of the IoT devices and their capabilities (events and actions) using the APIs provided by the vendors.

FIG. 1 schematically depicts a system according to certain embodiments of the present disclosure. As shown in FIG. 1, the system 100 includes a control device 110, a gateway device 120, and a plurality of IoT devices 130. The gateway device 120 is communicatively connected to the control device 110 through a network 140 under a corresponding protocol, such as a Wi-Fi protocol. Further, the gateway device 120 is communicatively connected to each of the IoT devices 130 through a plurality of networks 142, 144 and 146, and the connection between the gateway device 120 and each of the IoT devices 130 may be under different corresponding protocols. In certain embodiments, each of the networks 140, 142, 144 and 146 may be an independent and separate network from one another, and each of the networks 140, 142, 144 and 146 may be wired or wireless network under different protocols, and may be of various forms. Examples of the networks may include, without being limited to, a local area network (LAN) or a wide area network (WAN) including the Internet; an I2C network; a Bluetooth network; a Wi-Fi network; a Zigbee network; a cloud network; or any other types of networks under any protocol. Further, the number of different networks provided in the system 100 may be dependent upon the types of the IoT devices 130 being provided. For example, when an additional IoT device 130 is added to the system 100, an additional network may be applied to interconnect the additional IoT device 130 and the gateway device 120. In certain embodiments, the network and the protocol being used to interconnect one or more of the IoT device 130 and the gateway device 120 may be the same network 140 and the same protocol being used to interconnect the gateway device 120 and the control device 110.

The control device 110 is a computing device being used by a user to control the IoT devices 130. In certain embodiments, the control device 110 may be a mobile device, such as a smartphone, a tablet, a laptop computer, or any other types of mobile devices. In certain embodiments, the control device 110 may be other computing devices, such as a desktop computer, a management controller, a system-on-chip (SOC), or any other types of computing device.

Figure 2A:
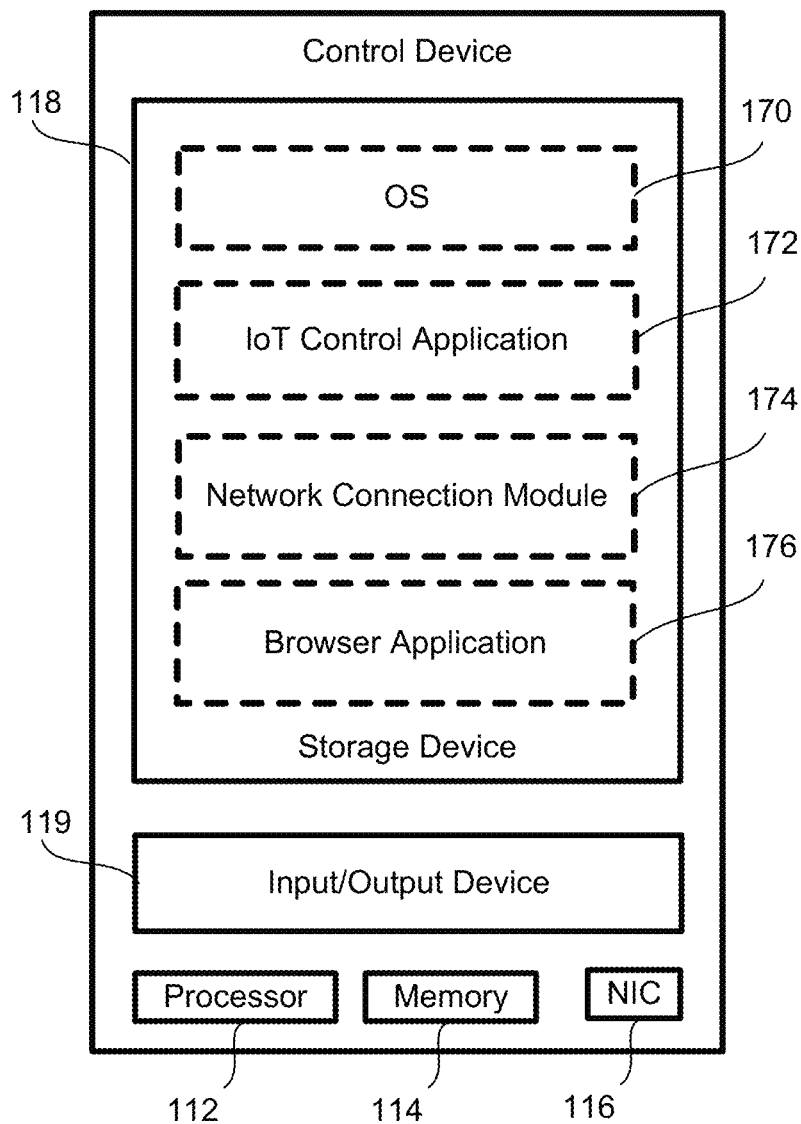
FIG. 2A schematically depicts a control device of the system according to certain embodiments of the present disclosure.

FIG. 2A schematically depicts a control device of the system according to certain embodiments of the present disclosure. As shown in FIG. 2A, the control device 110 may include, without being limited to, a processor 112, a memory 114, a network interface card (NIC) 116, a storage device 118, and one or more input/output (I/O) device 119. In certain embodiments, the control device 110 may include other hardware components and software components (not shown) to perform its corresponding tasks. Examples of these hardware and software components may include, but not limited to, other required memory, interfaces, buses, I/O modules and peripheral devices.

The processor 112 is configured to control operation of the control device 110. In certain embodiments, the processor 112 may be a central processing unit (CPU). The processor 112 can execute an operating system (OS) 170 and/or other applications, such as the IoT control application 172, of the control device 110. In some embodiments, the control device 110 may have more than one processor, such as two processors, four processors, eight processors, or any suitable number of processors.

The memory 114 can be a volatile memory, such as the random-access memory (RAM), for storing the data and information during the operation of the control device 110. In certain embodiments, the control device 110 may run on more than one memory 114.

The NIC 116 is a network interface, which functions as a point of interconnection between the control device 110 and the gateway device 120 through the network 140. In certain embodiments, the NIC 116 may be implemented by hardware and/or software components, and does not necessarily have a physical form. In certain embodiments, the control device 110 may include more than one NIC 116 to be connectable to multiple different networks.

The storage device 118 is a non-volatile data storage media for storing the OS 170 and other applications of the control device 110. Examples of the storage device 118 may include non-volatile memory such as flash memory, memory cards, USB drives, hard drives, floppy disks, optical drives, or any other types of data storage devices. In certain embodiments, the control device 110 may have multiple storage devices 118, which may be identical storage devices or different types of storage devices, and the applications of the control device 110 may be stored in one or more of the storage devices 118 of the control device 110.

The I/O device 119 is a peripheral device to allow the user of the control device 110 to input and output signals to/from the control device 110. In certain embodiments, the control device 110 may include more than one I/O devices 119. In certain embodiments, each of the I/O devices 119 may be an input device such as a keyboard, a mouse, a touchpad or other input devices; an output device such as a display device, a speaker, or other output devices, or a I/O device capable of dual I/O purposes, such as a touch panel of a mobile device.

As shown in FIG. 2A, the applications stored in the storage device 118 may include the OS 170, an IoT control application 172, a network connection module 174, and a browser application 176. Each of the applications may include computer executable code or instructions executable at the processor 112 of the control device 110. In certain embodiments, the computer executable code or instructions of the applications may collectively form a firmware module. In certain embodiments, one or more of the applications may each include sub-modules. Alternatively, in certain embodiments, some or all of the applications may collectively form a single module.

The OS 170 is a collective management software application managing the operation of the control device 110. For example, the OS 170 can include a set of functional programs that control and manage operations of the devices connected to the control device 110. The set of application programs provide certain utility software for the user to manage the control device 110. In certain embodiments, the OS 170 is operable to multitask, i.e., execute computing tasks in multiple threads. Examples of the OS 170 may be any of the commercial operating systems. For example, when the control device 110 is a mobile device, the OS may be iOS, Android, Microsoft Windows 8, Blackberry OS, or any other mobile operating systems for the mobile device.

The IoT control application 172 is a unified application to control the IoT devices 130 through the gateway device 120. In certain embodiments, when the IoT control application 172 is executed, the IoT control application 172 may be used to process inputs received through the web UI displayed by the browser application 176, and generate corresponding commands based on the input. In certain embodiments, the IoT control application 172 is configured to receive inputs corresponding to an interaction through the web UI displayed by the browser application 176, and generate a rule command to define an interaction based on the inputs. Specifically, the inputs received may include information corresponding to a first IoT device, an event occurred at the first IoT device, a second IoT device, and an action to be performed at the second IoT device, which is triggered by the event occurred at the first IoT device. Based on the information included in the inputs, an interaction may be defined between the first IoT device and the second IoT device. Thus, the IoT control application 172 may process the input and generate a corresponding rule command to define the interaction, and then send the rule command to the gateway device 120.

The network connection module 174 is a software module to control data being transmitted through the NIC 116. In certain embodiments, when the OS 170 or the IoT control application 172 intends to transmit a command or data to the network through the NIC 116, the network connection module 174 may process the command or the data and transmit the processed command or data to the network through the NIC 116. In certain embodiments, when the control device 110 receives a signal from the network 140 through the NIC 116, the network connection module 174 may process the signal, and forward the processed signal to the corresponding application, such as the OS 170 or the IoT control application 172.

The browser application 176 is a is a web browser software for retrieving, presenting, and traversing information resources on the Internet. In certain embodiments, the browser application 176 functions as a web client, which is connected to the UI module 155 of the gateway device 120, such that a user (e.g., an administrator of the system 100) may access the web UI of the gateway device 120 in order to remotely control the IoT devices 130. In certain embodiments, the administrator may operate the browser application 176 send a request to the gateway device 120 for the web UI (i.e., the UI). In response to the request, the UI module 155 may send the web UI to the control device 110. When the browser application 176 receives the web UI, the browser application 176 may present the web UI on the I/O device 119 of the control device 110, in order to display the information of the IoT devices 130 of the system 100 on the I/O device 119 through the web UI. When the user operates the I/O device 119 to generate inputs through the web UI, the browser application 176 sends the inputs to the IoT control application 172 for processing. In certain embodiments, the browser application 176 and the IoT control application 172 may be combined as one single module, such that the display of the web UI and the processing of the inputs may be performed by the module.

The gateway device 120 is an intermediate device between the control device 110 and the IoT devices 130. Specifically, the gateway device 120 functions as a central hub node of the system 100. In certain embodiments, the gateway device 120 includes multiple hardware interfaces, such as I2C, Bluetooth, Wi-Fi, Zigbee, etc., and provides multiple APIs and multiple connection protocols, such that the gateway device 120 may physically access to all IoT devices 130 available in the system 100. In certain embodiments, the gateway device 120 may be implemented by a hub device or a computing device, such as a management controller or a SOC. In certain embodiments, the gateway device 120 may be a headless computing device, which operates without a monitor, a user interface or peripheral devices such as a keyboard and a mouse. The operation of the gateway device 120 may be remotely controlled and monitored by the control device 110. In operation, the gateway device 120 monitors for events to occur at the IoT devices 130. When an event occurs at one of the IoT devices 130, and the gateway device 120 stores a corresponding interaction rule, the gateway device 120 controls another IoT device 130 to perform required actions automatically without any user action.

Figure 2B:
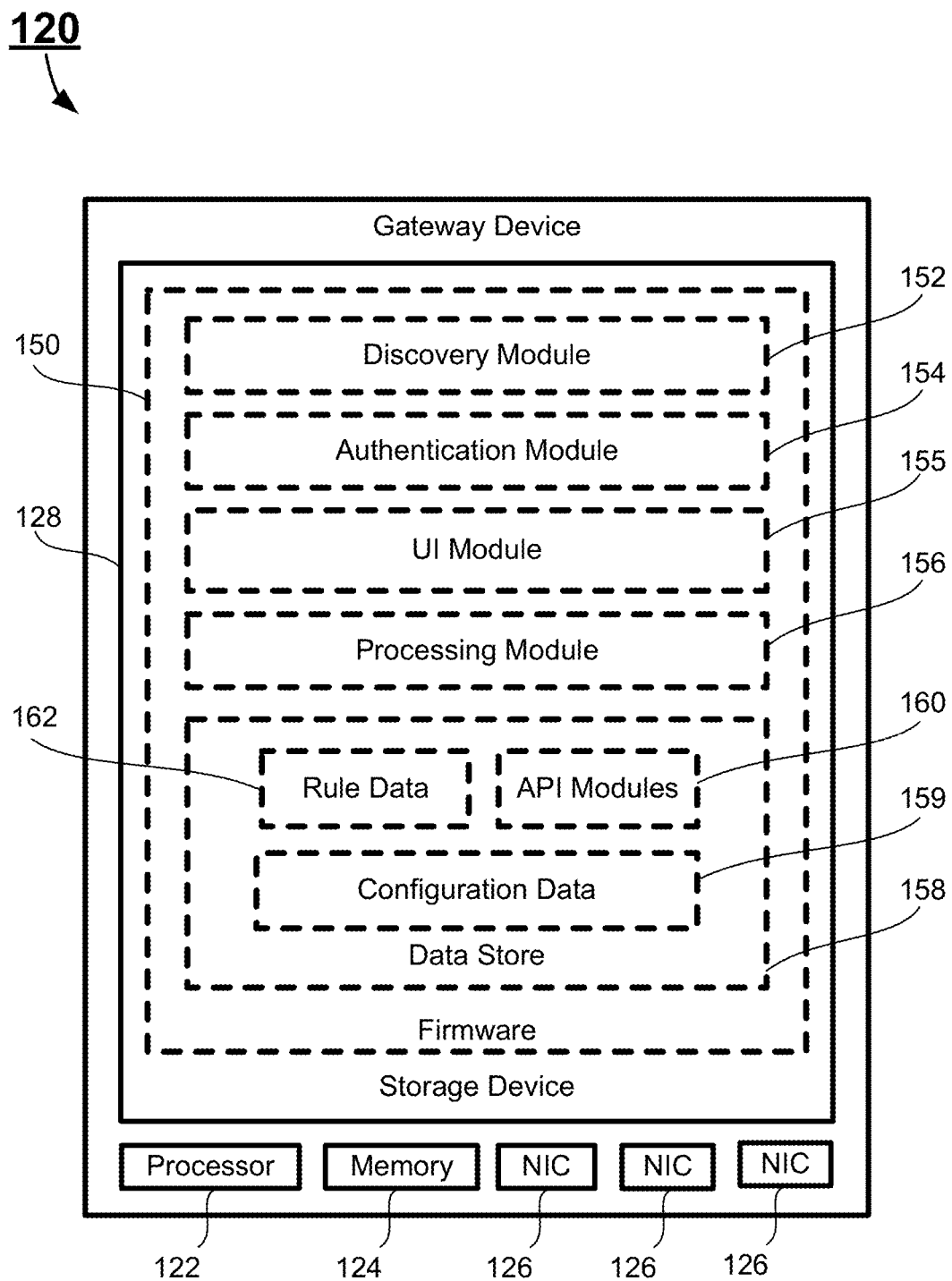
FIG. 2B schematically depicts a gateway device of the system according to certain embodiments of the present disclosure.

FIG. 2B schematically depicts a gateway device of the system according to certain embodiments of the present disclosure. As shown in FIG. 2B, the gateway device 120 may include, without being limited to, a processor 122, a memory 124, multiple NICs 126, and a storage device 128. In certain embodiments, the gateway device 120 may include other hardware components and software components (not shown) to perform its corresponding tasks. Examples of these hardware and software components may include, but not limited to, other required memory, interfaces, buses, I/O modules and peripheral devices.

The processor 122 is configured to control operation of the gateway device 120. In certain embodiments, the processor 122 may be a central processing unit (CPU). The processor 122 can execute the software modules or applications of the gateway device 120. In some embodiments, the gateway device 120 may have more than one processor, such as two processors, four processors, eight processors, or any suitable number of processors.

The memory 124 can be a volatile memory, such as the random-access memory (RAM), for storing the data and information during the operation of the gateway device 120. In certain embodiments, the gateway device 120 may run on more than one memory 124.

Each of the NICs 126 is a network interface, which functions as a point of interconnection between the gateway device 120 and the networks 140, 142, 144 and 146. The number of the NICs 126 may be dependent upon the available networks and protocols to which the gateway device 120 is connected. Since the gateway device 120 is communicatively connected to the control device 110 and to the IoT devices 130, each of the NICs 126 must be operational under the first protocol, which is used for communication with the control device 110, or under one of the corresponding protocols for the IoT devices 130. In certain embodiments, the NICs 126 may be implemented by hardware and/or software components, and does not necessarily have a physical form. In certain embodiments, some or all of the NICs 126 may be a dedicated NIC, which is dedicated for connection to one of the networks under a certain protocol. Alternatively, in certain embodiments, some or all of the NICs 126 may be a shared NIC, which may be responsible for connection to one or more of the networks under different protocols.

The storage device 128 is a non-volatile data storage media for storing the software modules and/or applications of the gateway device 120. Examples of the storage device 128 may include non-volatile memory such as flash memory, memory cards, USB drives, hard drives, floppy disks, optical drives, or any other types of data storage devices. In certain embodiments, the gateway device 120 may have multiple storage devices 128, which may be identical storage devices or different types of storage devices, and the software modules and/or applications of the gateway device 120 may be stored in one or more of the storage devices 128 of the gateway device 120.

As shown in FIG. 2B, the software modules stored in the storage device 128 may include a discovery module 152, an authentication module 154, a UI module 155, a processing module 156, and a data store 158, which stores configuration data 159 of the control device 110 and the IoT devices 130 and a plurality of API modules 160. Each of the software modules may include computer executable code or instructions executable at the processor 112 of the control device 110. In certain embodiments, the computer executable code or instructions of the applications may collectively form a firmware module. In certain embodiments, one or more of the applications may each include sub-modules. Alternatively, in certain embodiments, some or all of the applications may collectively form a single module.

The discovery module 152 is configured to perform the discovery operations for the IoT devices 130. In certain embodiments, the discovery module 152 may be scheduled to perform the discovery operations periodically according to a predetermined schedule. Alternatively, the discovery module 152 may perform a discovery operation according an instruction received from the control device 110. Specifically, in the discovery operation, the discovery module 152 is configured to send one or more request messages to the networks of the system 100 via the NICs 126. If an IoT device 130 is in one of the networks and receives a request message, the IoT device 130 may then send a feedback message to the discovery module 152, such that a communication channel is constructed between the IoT device 130 and the discovery module 152 through the corresponding network under the corresponding protocol. The feedback message may include identification information and status of the corresponding IoT device 130, such that the discovery module 152 may recognize the IoT device 130 using the information. In certain embodiments, the discovery operations may utilize the standard discovery mechanisms under certain protocols, or may utilize existing vendor-specific discovery mechanisms provided by the vendors of the IoT devices 130.

The authentication module 154 is configured to perform the authentication operations for the IoT devices 130. Specifically, when the discovery module 152 finds a new IoT device in one of the networks of the system 100, the new IoT device must be authenticated before being added to the system 100. In response to finding the new IoT device, the authentication module 154 may generate a notification corresponding to the new IoT device being discovered, and send the notification to the control device 110 for approval. In certain embodiments, the notification includes the identification information and other related information of the new IoT device being discovered. When the control device 110 receives the notification, the user at the control device 110 may choose to approve or to reject the authentication of the new IoT device being discovered through the UI. Once the control device 110 receives the user input, the control device 110 may correspondingly generate an approval command or a rejection command based on the user input, and send the approval command or the rejection command to the gateway device 120. At the gateway device, when the authentication module 154 receives the approval command, the authentication module 154 may store information of the corresponding API, the corresponding network and the corresponding protocol specific for the new IoT device being discovered in the data store 158 as the configuration data 159 of the new IoT device being discovered, and authenticate the new IoT device being discovered to become one of the authenticated IoT devices 130. On the other hand, if the authentication module 154 receives the rejection command, the authentication module 154 does nothing, and the new IoT device being discovered is not authenticated.

It should be noted that a user of the system 100 may choose to authenticate only some, but not all, of the IoT devices being discovered in the discovery operations. For example, in a house having multiple IoT devices to control the doors, lights and electronic devices, the user (i.e., an owner of the house) may choose to authenticate all of the IoT devices 130 within the house, such that he or she may have control over all of the authenticated IoT devices 130 within the house. However, the neighbors may also use IoT devices, and the IoT devices in the neighborhood may be within the accessible range of the wireless network connected to the gateway device 120. In this case, the user (i.e., the owner of the house) would probably not want to control any IoT device in a neighbor's house because it may causes unnecessary troubles. Thus, if the gateway device 120 performs the discovery operation and finds an IoT device in the neighborhood, the user probably would not authenticate the IoT device to avoid troubles.

The UI module 155 is configured to provide a web UI for the control device 110. Specifically, the UI module 155 provides the web UI, such that the user (e.g., the administrator of the system 100) at the control device 110 may operate the web UI to define interactions between the IoT devices 130. In certain embodiments, the web UI may be a GUI. The GUI may be a HTML5 web based interface, which is configured to display information of the IoT devices 130, events and actions as icons for the user at the control device 110 to select. In certain embodiments, the UI module 155 may function as a web server, which allows the user at the control device 110 to operate the browser program 176 to request for the GUI. In response, the UI module 155 sends the GUI to the control device 110, such that the browser application 176 at the control device 110 may display the GUI. The user may then select the icons to choose the IoT devices 130 in order to create an interaction command between two IoT devices 130 (e.g., a first IoT device and a second IoT device). For example, the user may select an icon of the first IoT device, an then select an icon corresponding to an event occurred at the first IoT device. Then the user may select an icon of the second IoT device, and then select an icon corresponding to an action performed at the second IoT device. Thus, an interaction may be created between the first IoT device and the second IoT device. Once the interaction command is sent to the gateway device 120, the UI module 155 forwards the interaction command to the processing module 156 for further processing.

The processing module 156 is configured to perform the communications among the control device 110 and the IoT devices 130. In certain embodiments, the processing module 156 may receive the rule command forwarded by the UI module 155, and process the rule command to create an interaction rule for the interaction between two IoT devices 130 (e.g., a first IoT device and a second IoT device). The processing module 156 may then store the interaction rule created in the data store 158. Further, the processing module 156 may receive a signal from an IoT device 130 (e.g., the first IoT device) to indicate the event. Based on the signal received from the first IoT device 130, the processing module 156 may determine that the event has occurred at the first IoT device 130, and then check the data store 158 for the interaction rule corresponding to the first IoT device 130. If such interaction rule exists, the processing module 156 then generates a triggering command based on the interaction rule, and sends the triggering command to the second IoT device to trigger the action at the second IoT device.

In certain embodiments, the data store 158 may store multiple interactions rules, and for each of the IoT devices 130, a plurality of events may occur at the IoT device 130. In this case, when the processing module 156 receives the signal from an IoT device 130, the processing module 156 must determine what the event is based on the signal, in order to determine whether the event is defined in one of the interaction rules to trigger an action at another IoT device 130. For example, the processing module 156 may receive a signal from a first IoT device through the corresponding network under the corresponding protocol for the first IoT device. In order to determine the event, the processing module 156 may retrieve the configuration data of the first IoT device from the data store 158, and then select a corresponding API specific for the first IoT device based on the configuration data of the first IoT device. Using the corresponding API specific for the first IoT device, the processing module 156 may process the signal to determine that a corresponding event has occurred at the first IoT device. In certain embodiments, when multiple events may occur at the first IoT device, the processing module 156 may determine, from a list of the multiple events, a certain event corresponding to the signal.

In certain embodiments, once the processing module 156 determines that an event has occurred at the first IoT device, the processing module 156 may then retrieve the interaction rule based on information of the event. Then the processing module 156 may determine, based on the interaction rule, a second IoT device where the action is to be performed. In order to trigger the action at the second IoT device, the processing module 156 may retrieve the configuration data of the second IoT device from the data store 158. Based on the configuration data of the second IoT device, the processing module 156 may then select a corresponding API API specific for the second IoT device, and determine the corresponding network and the corresponding protocol for the second IoT device. Finally, the processing module 156 may generate the triggering command using the corresponding API specific for the second IoT device based on the interaction rule.

The data store 158 is a database which stores the necessary data for the operation of the gateway device 120. In certain embodiments, the data stored in the data store 158 may include, without being limited to, the information of the control device 110, the configuration data of the authenticated IoT devices 130, the interaction rule (or rules) for the interaction between IoT devices 130, and the APIs. As shown in FIG. 2B, the data store 158 include a configuration data module 159, a plurality of API modules 160, and rule data module 162. The configuration data module 159 stores the information of the control device 110 and the configuration data of each of the authenticated IoT devices 130. In certain embodiments, for each of the authenticated IoT devices 130, the configuration data may include, without being limited to, the corresponding network and the corresponding protocol specific for the authenticated IoT device 130. The API modules 160 include the APIs for the authenticated IoT devices 130. In certain embodiments, each of the APIs may be a standard API, such as Thread or UPnP, or a vendor-specific proprietary API provided by the vendors. The rule data module 162 stores the interaction rules between the IoT device 130.

Each of the IoT devices 130 is a device with IoT functionalities, which communicates with the gateway device 120 such that the control device 110 may send commands to the IoT devices 130 through the gateway device 120. In certain embodiments, each of the IoT devices 130 may be capable of performing an action, or generating a signal. In certain embodiments, the IoT devices 130 may be capable of performing the action in response to an event. In certain embodiments, the event may be a command being sent from the gateway device 120. In certain embodiments, the signal being generated by one of the IoT devices 130 may be used as an event, which may be used to trigger the gateway device 120 to generate a corresponding command for an action of another IoT device 130. It should be particularly noted that, as described above, if an IoT device is not authenticated, the authentication module 154 will not add the information of the IoT device in the data store 158. Thus, each of the IoT devices 130 in the system 100 is an authenticated IoT device 130.

In operation, the control device 110 and the gateway device 120 may be configured to perform a discovery operation for new IoT devices. Once an IoT device has been added to the system as an authenticated IoT device 130, the gateway device 120 may send a command from the control device 110 to a selected IoT device 130. Alternatively, the gateway device 120 may send a signal from a designated IoT device 130 to the control device 110.

Figure 3:
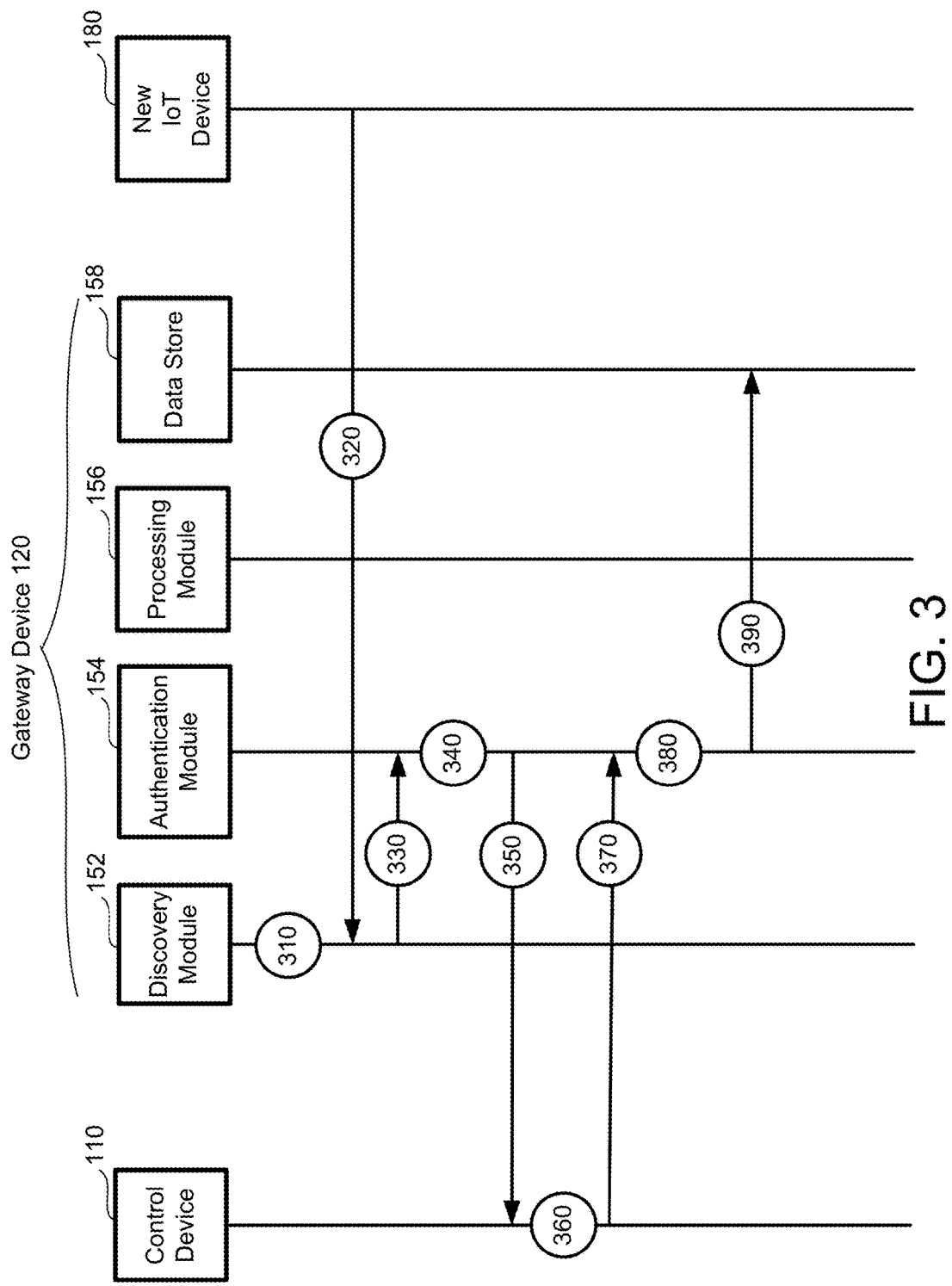
FIG. 3 depicts a flowchart showing a method for discovery of a new IoT device according to certain embodiments of the present disclosure.

FIG. 3 depicts a flowchart showing a method for discovery of a new IoT device according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the discovery module 152 performs a discovery operation to find available IoT devices. In certain embodiments, the discovery module 152 is configured to send one or more request messages to the networks of the system 100. In certain embodiments, the discovery module 152 may be scheduled to perform the discovery operations periodically according to a predetermined schedule. Alternatively, the discovery module 152 may perform a discovery operation according an instruction received from the control device 110. In certain embodiments, the discovery operations may utilize the standard discovery mechanisms under certain protocols, or may utilize existing vendor-specific discovery mechanisms provided by the vendors of the IoT devices 130.

At procedure 320, a new IoT device 180, which is within the discoverable range of the gateway device 120, sends a feedback message to the discovery module 152 in response to the request message of the discovery operation. Once receiving the feedback message, at procedure 330, the discovery module 152 notifies the authentication module 154 to perform an authentication operation for the new IoT device 180 being discovered.

At procedure 340, the authentication module 154 generates a notification corresponding to the new IoT device 180 being discovered. In certain embodiments, the notification includes the identification information and other related information of the new IoT device 180 being discovered. At procedure 350, the authentication module 154 sends the notification to the control device 110 through the network 140 under the first protocol. In certain embodiments, the notification may be sent through the web UI.

When the control device 110 receives the notification, at procedure 360, the IoT control application 172 of the control device 110 may display information corresponding to the new IoT device being discovered on the I/O device 119 through the web UI based on the notification, such that the user may choose to approve or reject authentication of the new IoT device. In certain embodiments, the user may use the I/O device 119 to input an choice to approve or to reject the authentication of the new IoT device 180. Once the control device 110 receives the user input, the IoT control application 172 of the control device 110 may generate, based on the user input, the corresponding approval command or the rejection command for the new IoT device 180. At procedure 370, the control device 110 sends the approval command or the rejection command back to the gateway device 120.

At the gateway device 120, once the approval command or the rejection command is received, at procedure 380, the authentication module 154 will determine whether the received command is an approval command. If the received command is a rejection command, the authentication module 154 does nothing. On the other hand, if the received command is an approval command, at procedure 390, the authentication module 154 may store information of the corresponding API, the corresponding network and the corresponding protocol specific for the new IoT device 180 in the data store 158 as the configuration data 159 of the new IoT device 180, and authenticate the new IoT device 180 to become one of the authenticated IoT devices 130. In this way, the authentication operation is completed.

FIG. 4 depicts a flowchart showing a method for defining an interaction between a first IoT device and a second IoT device according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the control device 110 may request the web UI from the gateway device 120. In certain embodiments, the browser application 176 sends the request to the gateway device 120 for the web UI. At the gateway device 120, when the UI module 155 receives the request, at procedure 415, the UI module 155 retrieves the configuration data of the IoT devices 130 and the interaction rules, if any, from the data store 158. Then, at procedure 420, the UI module 155 sends the web UI, along with the configuration data of the IoT devices 130 and the interaction rules, to the control device 110. At procedure 430, upon receiving the web UI, the control device 110 displays the information of the IoT devices 130 through the web UI, such that the user (e.g., the administrator) may select the IoT devices 130 to define an interaction.

At procedure 440, a user may control the I/O device 119 at the control device 110 to input information of the interaction, and the control device 110 may receive the inputs and generate a corresponding rule command to define the interaction. In certain embodiments, the inputs received may include information corresponding to a first IoT device, an event occurred at the first IoT device, a second IoT device, and an action to be performed at the second IoT device, which is triggered by the event occurred at the first IoT device. At procedure 450, the control device 110 may send the rule command to the gateway device 120.

Figure 5A:
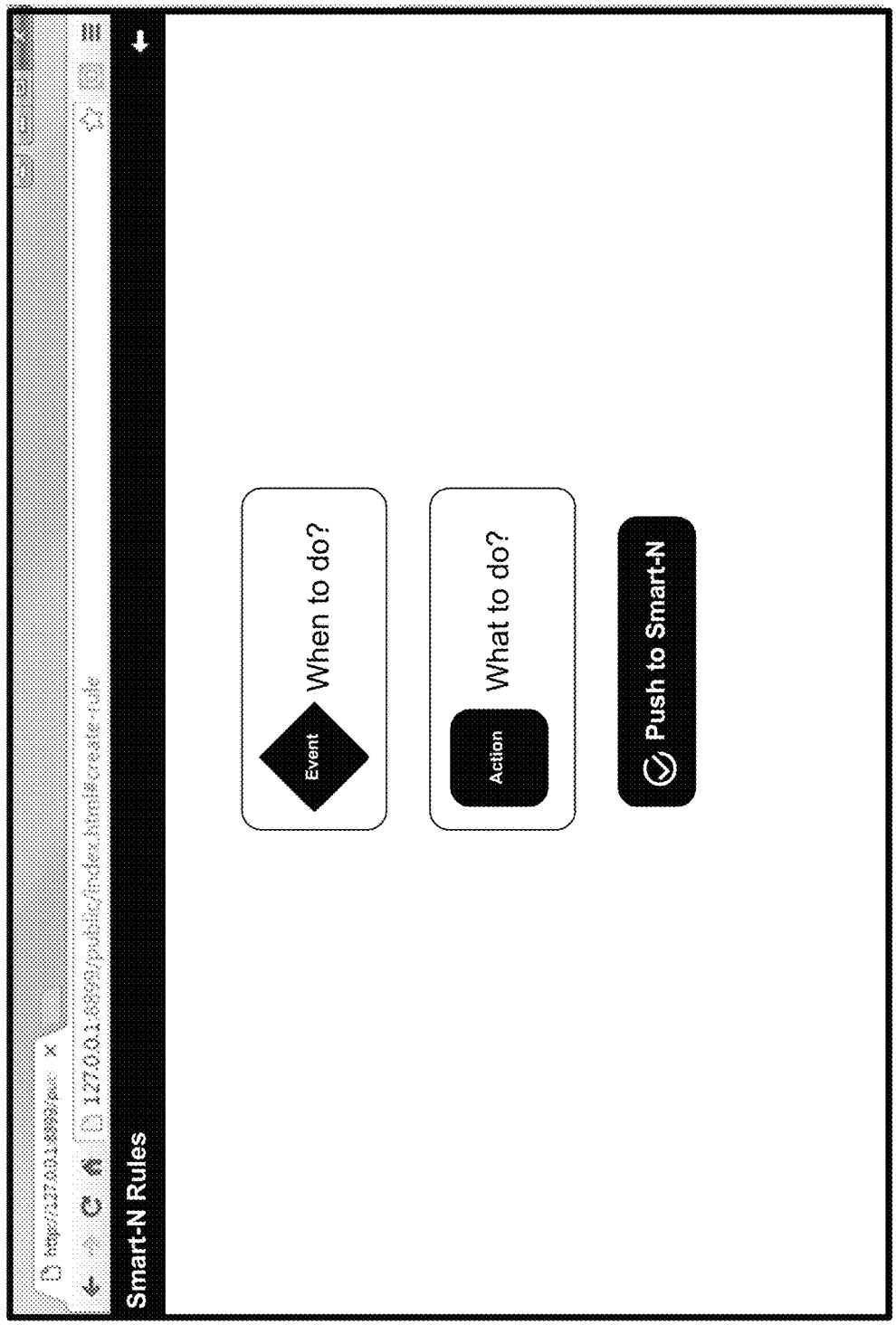
FIG. 5A schematically depicts a screenshot of a main page of a GUI for defining an interaction between IoT devices according to certain embodiments of the present disclosure.

An example to utilize the GUI to define an interaction may be illustrated with reference to FIGS. 5A to 5E. In particular, FIG. 5A schematically depicts a screenshot of a main page of a GUI for defining an interaction between IoT devices according to certain embodiments of the present disclosure. As shown in FIG. 5A, the main page of the GUI provides two buttons, one being labeled "When to do?" which relates to the event of the first IoT device and the other being labeled "What to do?" which relates to the action of the second IoT device. By clicking on the first or the second button, the pages as shown in FIGS. 5B and 5C will appear.

Figure 5B:
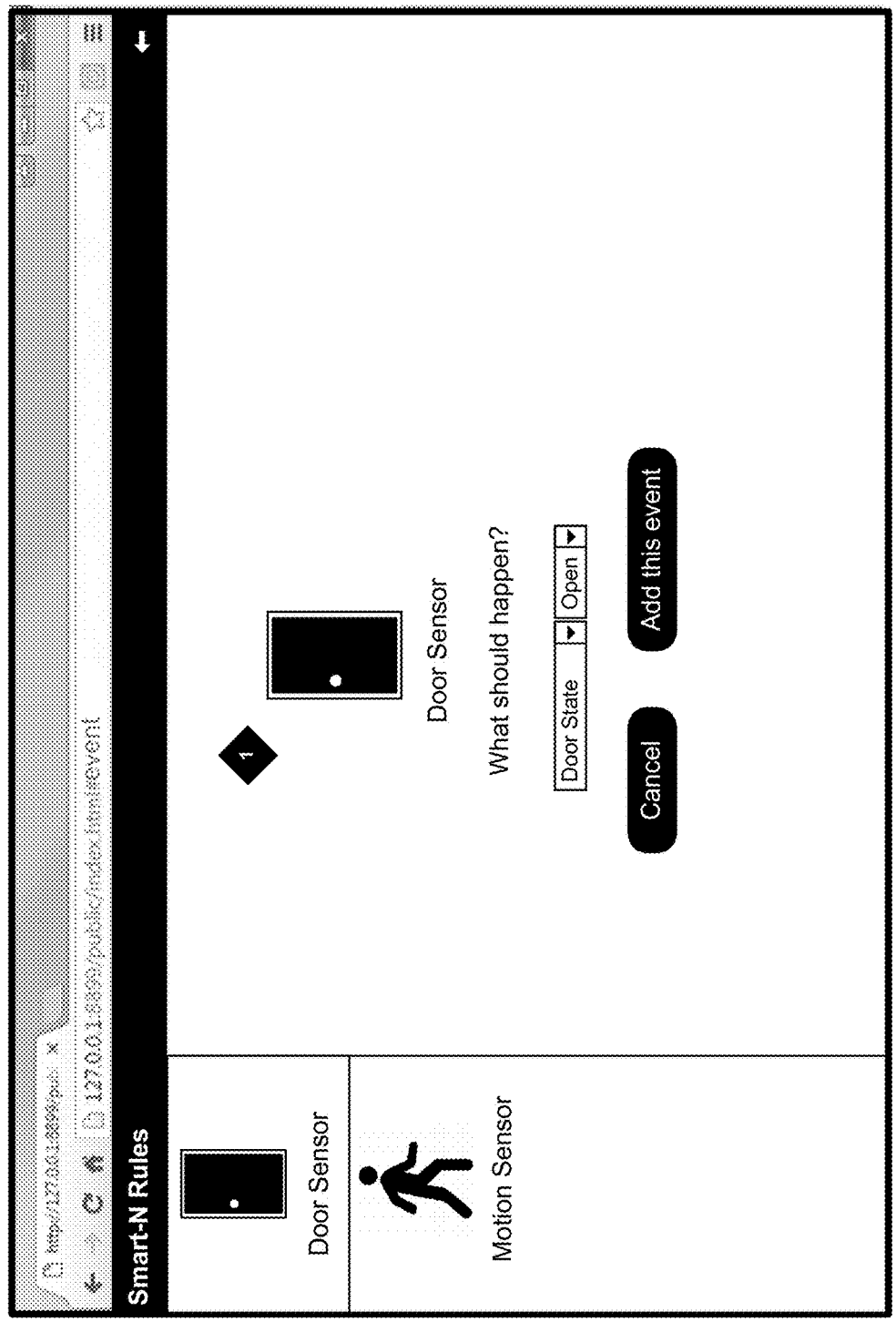
FIG. 5B schematically depicts a screenshot of a page of a GUI for defining a first IoT device and an event to occur at the first IoT device according to certain embodiments of the present disclosure.

FIG. 5B schematically depicts a screenshot of a page of a GUI for defining a first IoT device and an event to occur at the first IoT device according to certain embodiments of the present disclosure. As shown in FIG. 5B, a plurality of IoT devices (e.g., a door sensor and a motion sensor) are shown at the left side of the screen, allowing the user to select one of them as the first IoT device. For example, the door sensor is selected as the first IoT device, and the event is being defined as the door state being open.

Figure 5C:
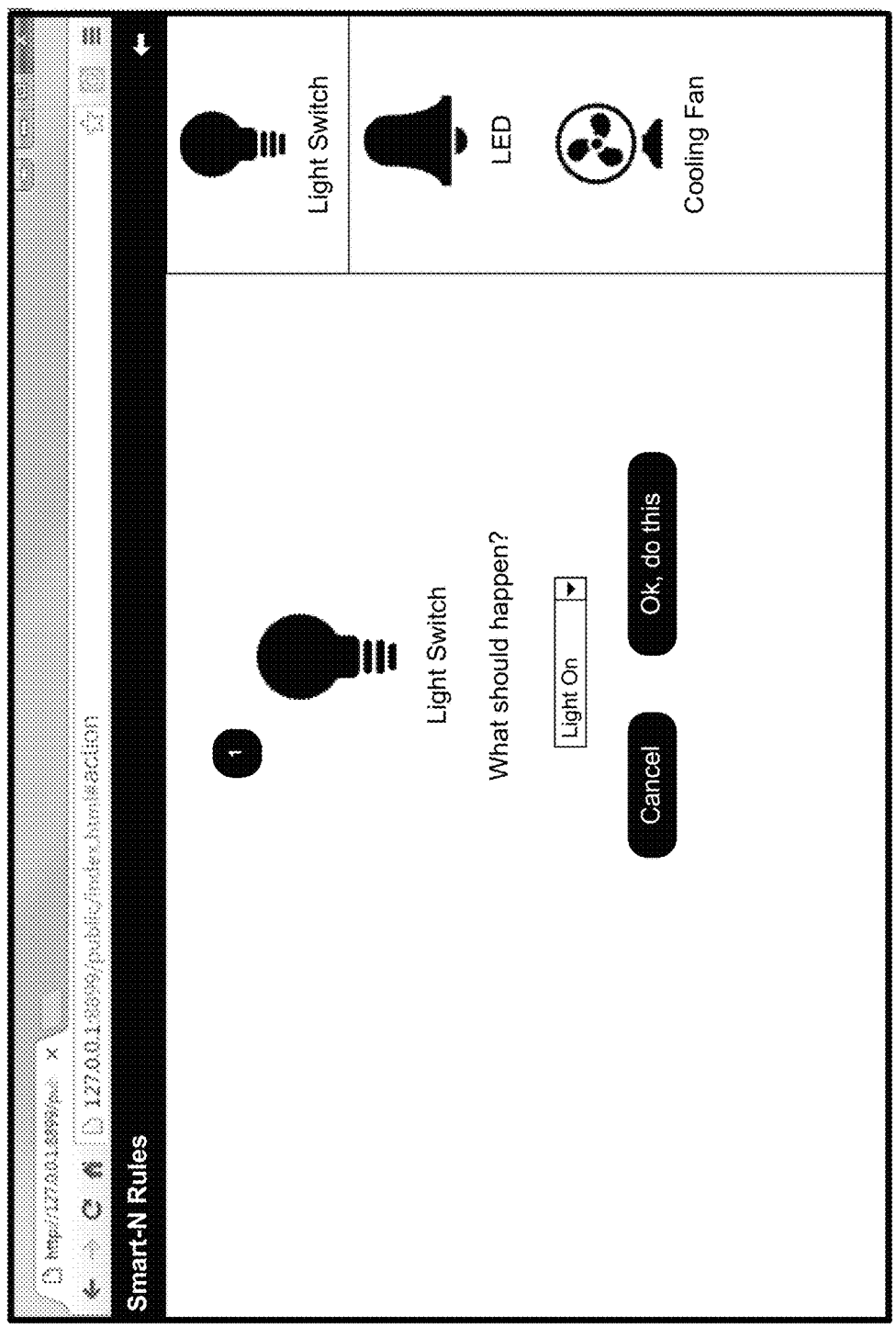
FIG. 5C schematically depicts a screenshot of a page of a GUI for defining a second IoT device and an action to be performed at the second IoT device according to certain embodiments of the present disclosure.

FIG. 5C schematically depicts a screenshot of a page of a GUI for defining a second IoT device and an action to be performed at the second IoT device according to certain embodiments of the present disclosure. As shown in FIG. 5C, a plurality of IoT devices (e.g., a light switch, an LED and a cooling fan) are shown at the right side of the screen, allowing the user to select one of them as the second IoT device. For example, the light switch is selected as the second IoT device, and the action is being defined as light on.

Figure 5D:
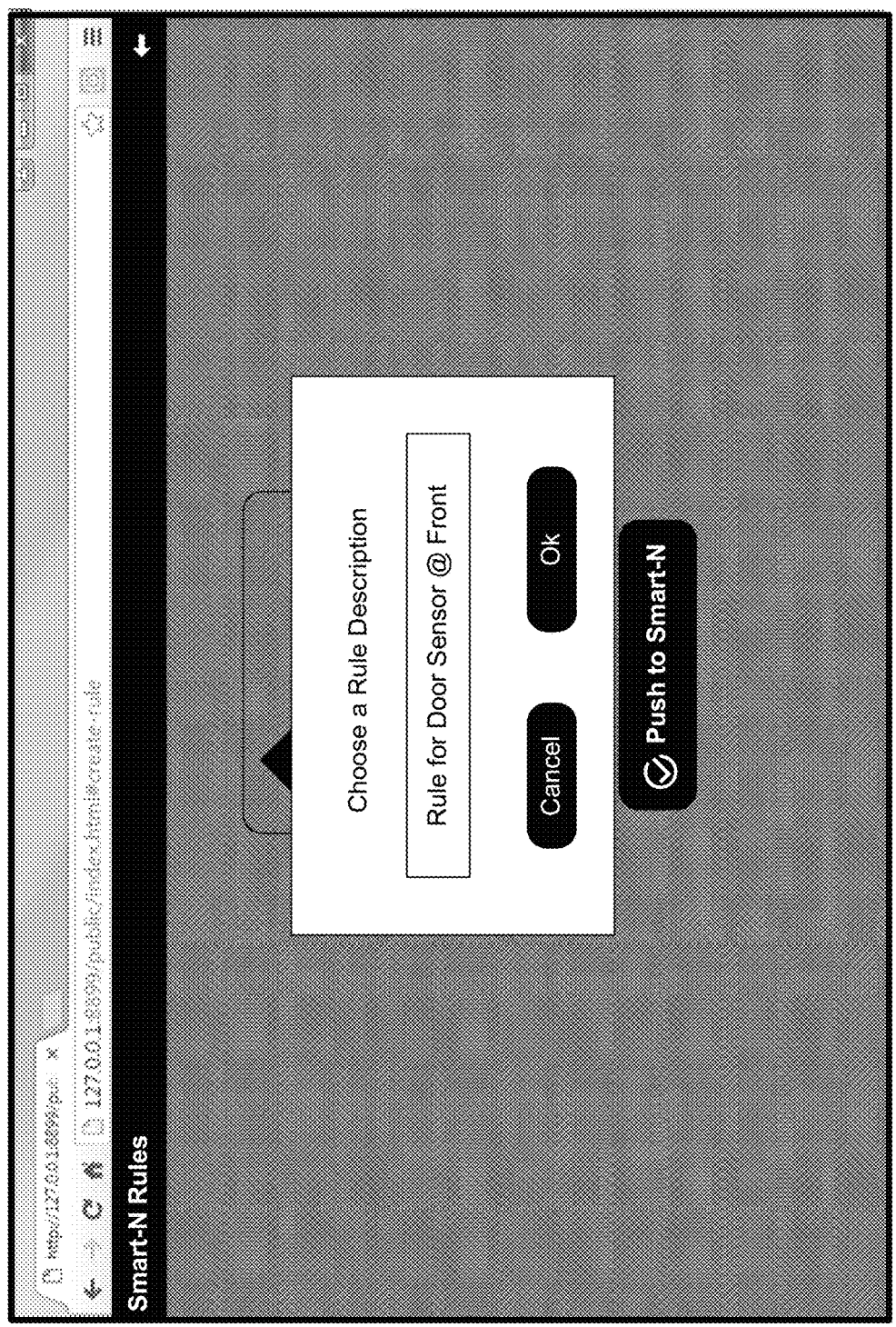
FIG. 5D schematically depicts a screenshot of a page of a GUI for confirming the interaction according to certain embodiments of the present disclosure.

FIG. 5D schematically depicts a screenshot of a page of a GUI for confirming the interaction according to certain embodiments of the present disclosure. As shown in FIG. 5D, once the event (door sensor detecting the door state to be open) and the action (light on) are both defined, the user may confirm the interaction by choosing a rule description for the new interaction being created. For example, the rule description as shown in FIG. 5D is "Rule for Door Sensor @ Front." Once the user clicks on the "Ok" button, the control device 110 may then send a corresponding rule command to the gateway device 120 to create the rule.

Referring back to FIG. 4, upon receiving the rule command at the gateway device 120, at procedure 460, the UI module 155 forwards the rule command to the processing module 156 for processing the rule command. At procedure 470, the processing module 156 creates an interaction rule for the interaction between the first IoT device and the second IoT device based on the rule command. At procedure 480, the processing module 156 stores the interaction rule being created in the data store 158.

Figure 5E:
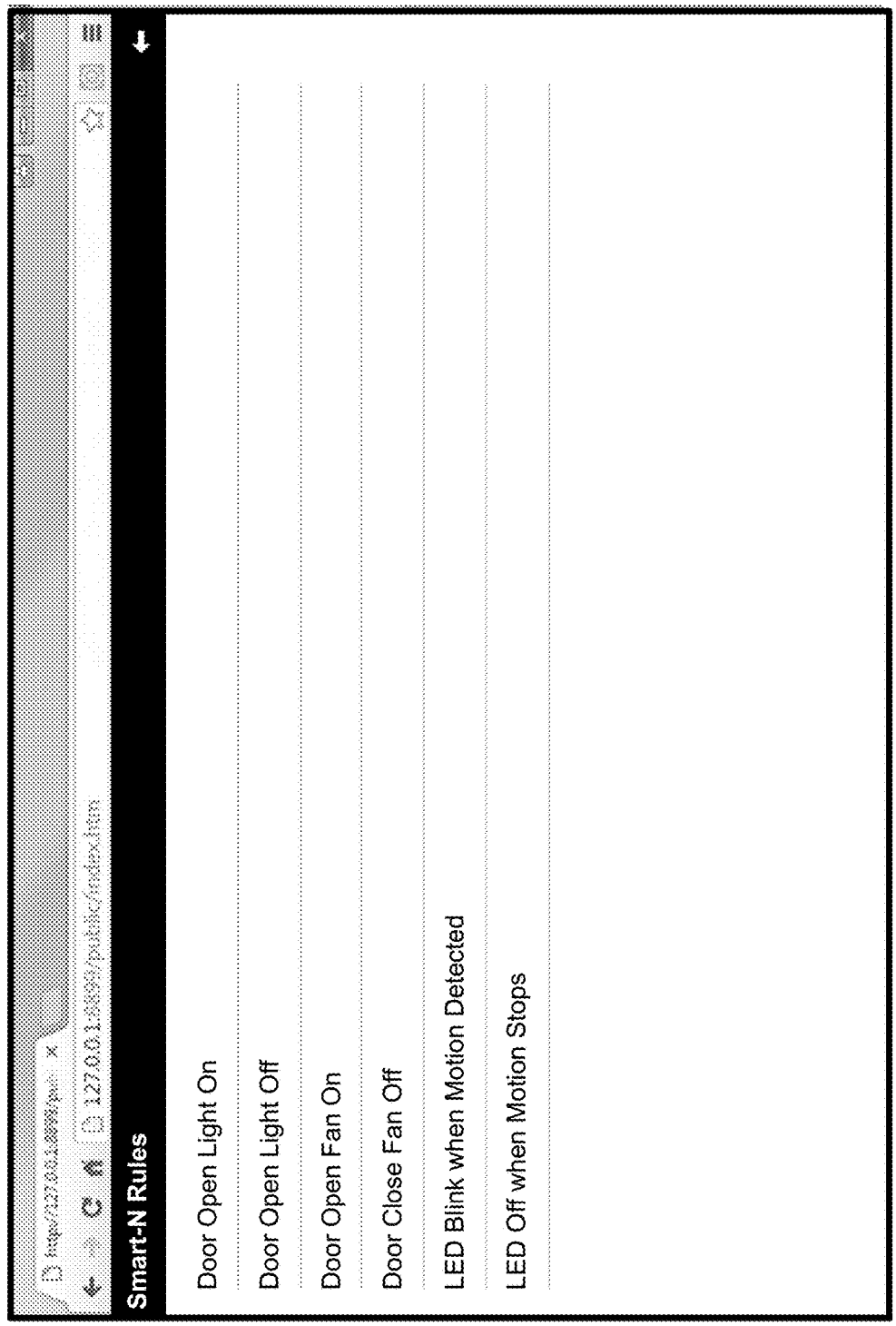
FIG. 5E schematically depicts a screenshot of a page of a GUI for listing the existing interaction rules according to certain embodiments of the present disclosure.

FIG. 5E schematically depicts a screenshot of a page of a GUI for listing the existing interaction rules according to certain embodiments of the present disclosure. In particular, multiple interaction rules may have been created and stored in the data store 158 of the gateway device 120. The user (e.g., the administrator) may operate the web UI in order to look for a listing of the existing interaction rules.

FIG. 6 depicts a flowchart showing a method for operation of the interaction between two IoT devices based on the interaction rule according to certain embodiments of the present disclosure. In certain embodiments, the method as shown in FIG. 6 may be implemented on a system as shown in FIG. 1, and the gateway device 120 as shown in FIG. 2B. It should be particularly noted that the control device 110 is not needed for the method as shown in FIG. 6. In other words, once the interaction rule is defined and stored in the gateway device 120, the interaction may operate without the need of user intervening. Further, unless otherwise stated in the present disclosure, the steps of the method may be arranged in a different sequential order, and are thus not limited to the sequential order as shown in FIG. 6.

As shown in FIG. 6, at procedure 605, a first IoT device 130-1 may generate a signal based on the event. For example, when the first IoT device 130-1 is a door sensor as shown in FIG. 5B, and the door sensor detects the door state to be open, the door sensor generates a corresponding signal. At procedure 610, the first IoT device 130-1 sends the signal to the gateway device 120 through the corresponding network under the corresponding protocol.

At the gateway device 120, upon receiving the signal, at procedure 620, the processing module 156 may retrieve the configuration data of the first IoT device 130-1 from the data store 158, and select, based on the configuration data of the first IoT device 130-1, the corresponding API specific for the first IoT device. Specifically, the signal may include information of the first IoT device 130-1 such that the processing module 156 may search for the configuration data of the first IoT device 130-1 based on the information. Once the API is selected, at procedure 630, the processing module 156 may process the signal using the corresponding API specific for the first IoT device 130-1 to determine that the event has occurred at the first IoT device 130-1.

Upon determining that the event has occurred at the first IoT device 130-1, at procedure 640, the processing module 156 may search for the interaction rule corresponding to the event in the data store 158. If such interaction rule exists, the processing module 156 retrieves the interaction rule. At procedure 650, the processing module 156 determines, based on the interaction rule, the second IoT device 130-2. Then, at procedure 660, the processing module 156 retrieves the configuration data of the second IoT device 130-2. Based on the configuration data of the second IoT device 130-2, the processing module 156 may select the corresponding API specific for the second IoT device 130-2, and determine the corresponding network and the corresponding protocol for the second IoT device 130-2. At procedure 670, the processing module 156 may generate the triggering command using the corresponding API specific for the second IoT device 130-2 based on the interaction rule. Then, at procedure 680, the processing module 156 sends the triggering command to the second IoT device 130-2 through the corresponding network under the corresponding protocol. At procedure 690, once the second IoT device 130-2 receives the triggering command, the second IoT device 130-2 may perform the action. For example, when the second IoT device 130-2 is a light as shown in FIG. 5C, the light may be turned on based on the triggered command.

With the system 100 as described above, the control device 110 provides a single GUI with the IoT control application and the browser application, such that the user may define one or more interaction rules between the IoT devices 130 under different protocols. Once the interaction rules are defined and stored in the gateway device 120, the interactions may be performed automatically without user intervening. In certain embodiments, when firmware upgrade and/or application update are required at the gateway device 120 or at the control device 110, a single upgrading or updating operation may be performed for each of the control device 110 and the gateway device 120, and there is no need to perform the upgrading or updating operations based on different IoT devices. Thus, the use of the gateway device 120 allows each of the IoT devices 130 to possibly interact with one another regardless of different protocols and different APIs being used by different IoT devices 130.

Figure 7A:
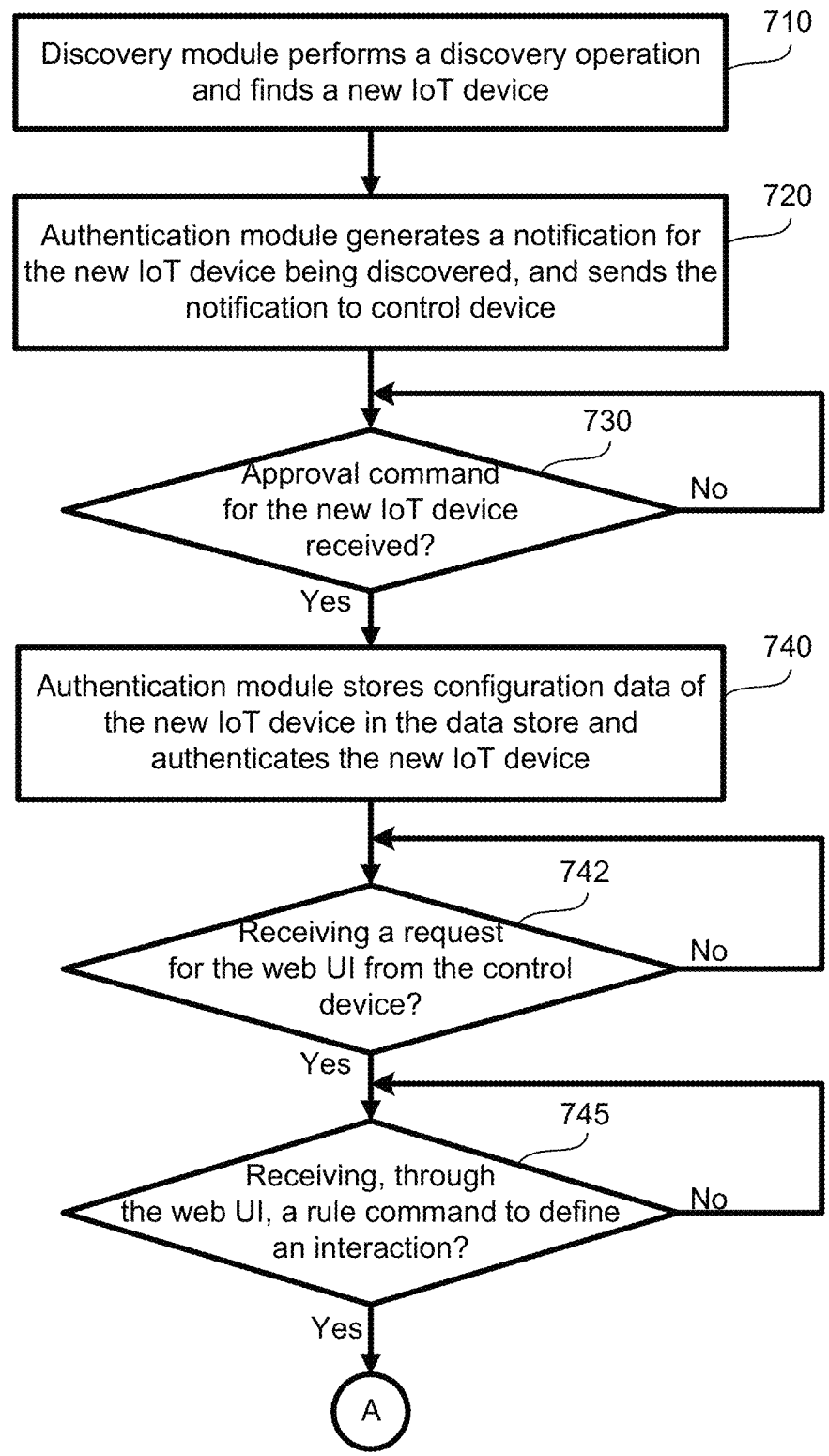
FIGS. 7A, 7B and 7C depict a flowchart showing a method for defining an interaction between heterogeneous IoT devices using the gateway device according to certain embodiments of the present disclosure.
Figure 7B:
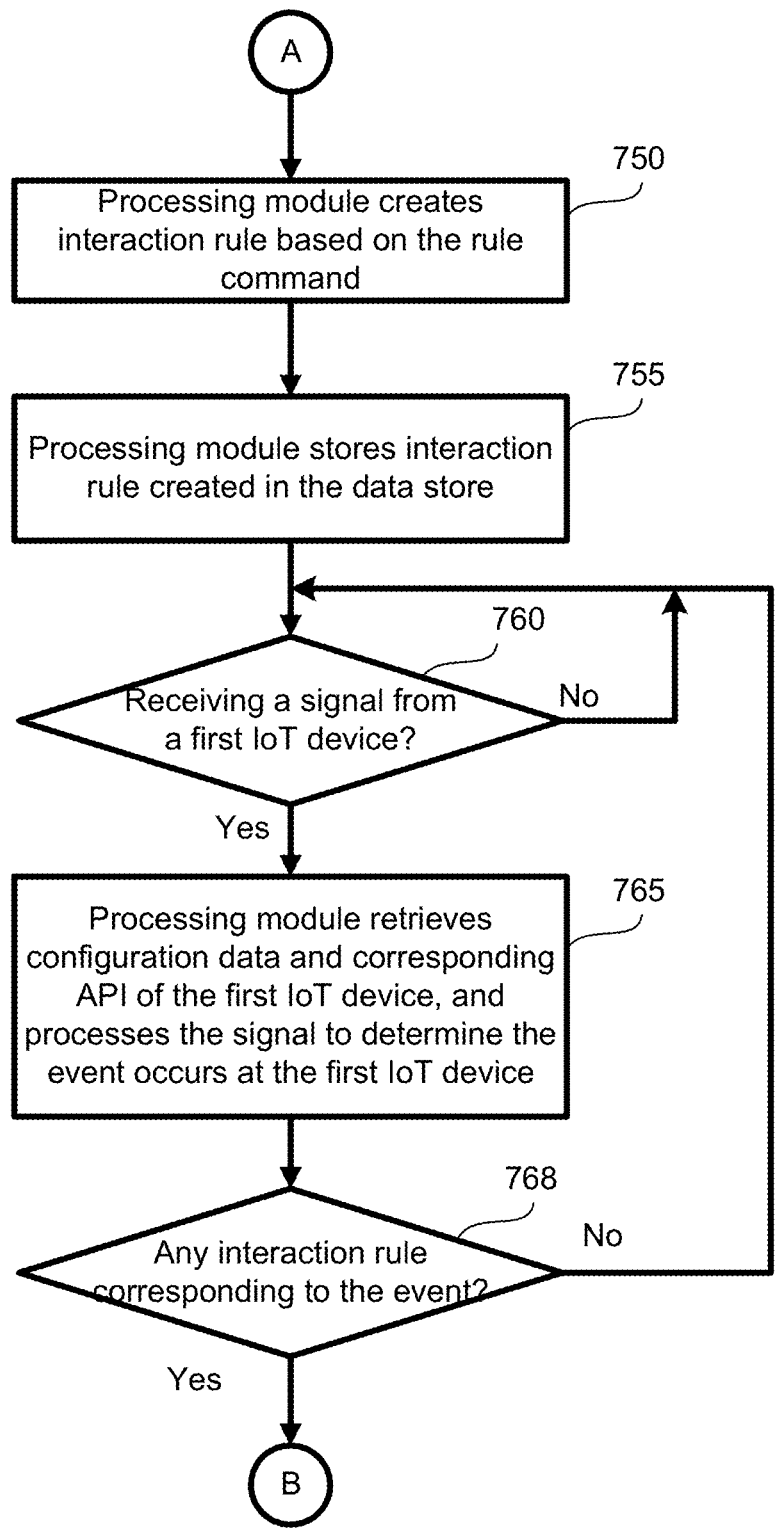
Figure 7C:
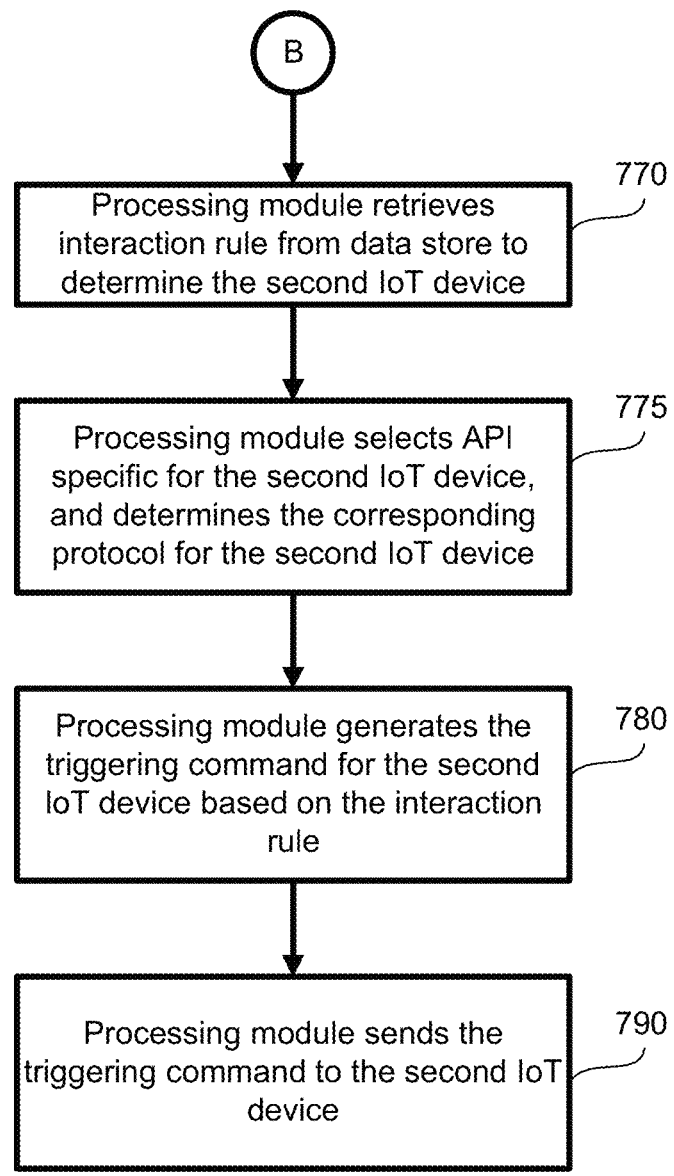

A further aspect of the present disclosure is directed to a method for defining an interaction between heterogeneous IoT devices. FIGS. 7A, 7B and 7C depict a flowchart showing a method for defining an interaction between heterogeneous IoT devices using the gateway device according to certain embodiments of the present disclosure. In certain embodiments, the method as shown in FIGS. 7A, 7B and 7C may be implemented on a system 100 as shown in FIG. 1 and the gateway device 120 as shown in FIG. 2B. It should be particularly noted that, unless otherwise stated in the present disclosure, the steps of the method may be arranged in a different sequential order, and are thus not limited to the sequential order as shown in the flowchart.

Referring to FIG. 7A, at procedure 710, when the gateway device 120 is installed, the discovery module 152 of the gateway device 120 may perform one or more discovery operations to find new IoT devices 180. Once a new IoT device 180 is discovered, at procedure 720, the authentication module 154 generates a notification for the new IoT device 180 being discovered, and sends the notification to the control device 110 for approval. Once the notification is sent, at procedure 730, the gateway device 120 waits for receiving of the approval command for the new IoT device 180. If the gateway device 120 receives the approval command for the new IoT device 180, at procedure 740, the authentication module 154 stores the configuration data of the new IoT device in the data store 158, and authenticates the new IoT device to become one of the authenticated IoT device 130. Alternatively, if the gateway device 120 does not receive any approval command, or instead receives a rejection command, the authentication module 154 does nothing, and the new IoT device 180 will not be authenticated.

Once the authenticated IoT device 130 is added to the system, at procedure 742, the gateway device 120 may wait for a request for the web UI from the control device 110. At the procedure 745, if the gateway device 120 receives the request, the gateway device 120 sends the web UI to the control device 110, and waits for a rule command to define an interaction through the web UI from the control device 110.

Referring to FIG. 7B, when the gateway device 120 receives a rule command to define an interaction through the web UI from the control device 110, at procedure 750, the processing module 156 creates the interaction rule based on the rule command. At procedure 755, the processing module 156 stores the interaction rule created in the data store 158. It should be noted that the procedures 745, 750 and 755 may be repeated to create multiple interaction rules.

Once the interaction rule (or rules) is created and stored in the data store 158, at procedure 760, the gateway device 120 waits for receiving a signal from a first IoT device 130-1. Upon receiving the signal from the first IoT device 130-1, at procedure 765, the processing module 156 retrieves the configuration data of the first IoT device 130-1 from the data store 158, and selects a corresponding API specific for the first IoT device 130-1. Then the processing module 156 processes the signal using the API to determine that the event occurs at the first IoT device 130-1. It should be noted that, in certain embodiments, multiple different events may occur at the first IoT device 130-1, and the processing module 156 must determine which event has occurred at the first IoT device 130-1 before searching for the correct interaction rule corresponding to the event.

At procedure 768, the processing module 156 searches in the data store 158 for the interaction rule corresponding to the event. If there is no existing interaction rule for the event, the processing module 156 does nothing. If there is one or more existing interaction rules for the event, the processing module 156 may proceed to perform the interaction.

Referring to FIG. 7C, at procedure 770, the processing module 156 retrieves the interaction rule (or rules, if there are multiple interaction rules corresponding to the same event) from the data store 158, and determine the second IoT device 130-2 based on the interaction rule. Once the second IoT device 130-2 is determined, at procedure 775, the processing module 156 may retrieve the configuration data of the second IoT device 130-2, and then selects the corresponding API specific for the second IoT device 130-2 and determines the corresponding network and corresponding protocol for the second IoT device 130-2 based on the configuration data of the second IoT device 130-2. At procedure 780, the processing module 156 may generate the triggering command using the corresponding API specific for the second IoT device 130-2 based on the interaction rule. Then, at procedure 790, the processing module 156 sends the triggering command to the second IoT device 130-2 through the corresponding network under the corresponding protocol.

In a further aspect, the present disclosure is related to a non-transitory computer readable medium storing computer executable code. The computer executable code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 128 of the gateway device 120 as shown in FIGS. 1 and 2B.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a control device; and
a gateway device communicatively connected to the control device and a plurality of authenticated internet of things (IoT) devices, wherein each of the control device and the authenticated IoT devices is communicatively connected to the gateway device through a corresponding network under a corresponding protocol, and the authenticated IoT devices comprise a first IoT device and a second IoT device;
wherein the gateway device comprises a processor and a storage device storing computer executable code, and the computer executable code comprises a data store storing information of the control device, configuration data of the authenticated IoT devices, an interaction rule for an interaction between the first IoT device and the second IoT device, and a plurality of application program interfaces (APIs);
wherein for each of the authenticated IoT devices, a corresponding API specific for the authenticated IoT device is selected from the APIs, and the configuration data comprises information of the corresponding API, the corresponding network and the corresponding protocol specific for the authenticated IoT device;
wherein the computer executable code, when executed at the processor, is configured to:

provide a web user interface (UI) for the control device, wherein the web UI is configured to display information of the authenticated IoT devices at the control device;
receive, through the web UI from the control device, a rule command to define the interaction between the first IoT device and the second IoT device, wherein the interaction comprises an event occurred at the first IoT device, and an action performed at the second IoT device triggered by the event at the first IoT device;
in response to the rule command, create the interaction rule for the interaction between the first IoT device and the second IoT device based on the rule command;
receive a signal from the first IoT device to indicate the event, and determine, based on the signal, that the event has occurred at the first IoT device;
in response to determining that the event has occurred at the first IoT device,
generate, based on the interaction rule for the interaction between the first IoT device and the second IoT device, a triggering command; and
send the triggering command to the second IoT device through the corresponding network under the corresponding protocol for the second IoT device to trigger the action at the second IoT device;
perform at least one discovery operation for available IoT devices;
in response to discovery of a new IoT device, generate an notification corresponding to the new IoT device being discovered, and send the notification to the control device;
receive, from the control device, an approval command to approve authentication of the new IoT device being discovered, or a rejection command to reject authentication of the new IoT device being discovered; and
in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices.

2. The system as claimed in claim 1, wherein:
the configuration data of the first IoT device further comprises information of the event;
the configuration data of the second IoT device further comprises information of the action; and
wherein the computer executable code further comprises:
a UI module, configured to provide the web UI, and receive the rule command from the control device; and
a processing module, configured to:
create the interaction rule for the interaction between the first IoT device and the second IoT device based on the rule command, and store the interaction rule in the data store;
receive the signal from the first IoT device, and determine, based on the signal, that the event has occurred at the first IoT device; and
in response to determining that the event has occurred at the first IoT device, generate, based on the interaction rule for the interaction between the first IoT device and the second IoT device, the triggering command, and send the triggering command to the second IoT device through the corresponding network under the corresponding protocol for the second IoT device to trigger the action at the second IoT device.

3. The system as claimed in claim 2, wherein the processing module is configured to receive the signal from the first IoT device, and determine, based on the signal, that the event has occurred at the first IoT device by:
receiving the signal from the first IoT device through the corresponding network under the corresponding protocol for the first IoT device;
retrieving the configuration data of the first IoT device;
selecting, based on the configuration data of the first IoT device, the corresponding API specific for the first IoT device; and
processing the signal using the corresponding API specific for the first IoT device to determine that the event has occurred at the first IoT device.

4. The system as claimed in claim 2, wherein the processing module is configured to generate the trigger command by:
retrieving the interaction rule for the interaction between the first IoT device and the second IoT device;
determining, based on the interaction rule, the second IoT device;
retrieving the configuration data of the second IoT device;
selecting, based on the configuration data of the second IoT device, the corresponding API specific for the second IoT device, and determine the corresponding network and the corresponding protocol for the second IoT device; and
generating the triggering command using the corresponding API specific for the second IoT device based on the interaction rule.

5. The system as claimed in claim 2, wherein the control device is a mobile device storing an IoT control application which, when executed at a processor of the mobile device, is configured to:
request the web UI from the gateway device;
in response to receiving the web UI, display the information of the authenticated IoT devices through the web UI;
receive inputs corresponding to the first IoT device, the event occurred at the first IoT device, the second IoT device, and the action performed at the second IoT device;
generate the rule command based on the inputs; and
send the rule command to the gateway device.

6. The system as claimed in claim 5, wherein the web UI is a graphic UI (GUI), and each of the first IoT device, the event occurred at the first IoT device, the second IoT device, and the action performed at the second IoT device is displayed as an icon in the GUI.

7. The system as claimed in claim 5, wherein the computer executable code further comprises:
a discovery module configured to perform the at least one discovery operation for the available IoT devices; and
an authentication module configured to:
in response to discovery of the new IoT device, generate the notification corresponding to the new IoT device being discovered, and send the notification to the control device;
receive, from the control device, the approval command to approve authentication of the new IoT device being discovered, or the rejection command to reject authentication of the new IoT device being discovered; and
in response to receiving the approval command to approve authentication of the new IoT device being discovered, store the information of the corresponding API, the corresponding network and the corresponding protocol specific for the new IoT device being discovered in the data store as the configuration data of the new IoT device being discovered, and authenticate the new IoT device being discovered to become the one of the authenticated IoT devices.

8. The system as claimed in claim 7, wherein the IoT control application, when executed at the processor of the mobile device, is further configured to:
receive the notification corresponding to the new IoT device being discovered from the gateway device;
display, based on the notification, information corresponding to the new IoT device being discovered on the user interface; and
in response to receiving an input corresponding to the new IoT device to approve or reject the authentication of the new IoT device being discovered, generate, based on the input, the approval command or the rejection command, and send the approval command or the rejection command to the gateway device.

9. The system as claimed in claim 1, wherein the gateway device further comprises a plurality of network interfaces, wherein each of the network interfaces is operational under one of the corresponding protocols for the control device and the authenticated IoT devices.

10. The system as claimed in claim 1, wherein the corresponding network for the control device is a Wi-Fi network.

11. A method for defining interactions between heterogeneous internet of things (IoT) devices from a control device, the method comprising:
providing a gateway device communicatively connected to the control device and a plurality of authenticated IoT devices, wherein each of the authenticated IoT devices is communicatively connected to the gateway device through a corresponding network under a corresponding protocol, and the authenticated IoT devices comprise a first IoT device and a second IoT device, wherein the gateway device comprises a data store storing information of the control device, configuration data of the authenticated IoT devices, an interaction rule for an interaction between the first IoT device and the second IoT device, and a plurality of application program interfaces (APIs), and wherein for each of the authenticated IoT devices, a corresponding API specific for the authenticated IoT device is selected from the APIs, and the configuration data comprises information of the corresponding API, the corresponding network and the corresponding protocol specific for the authenticated IoT device;
providing, by the gateway device, a web user interface (UI) for the control device, wherein the web UI is configured to display information of the authenticated IoT devices at the control device;
receiving, by the gateway device, a rule command to define the interaction between the first IoT device and the second IoT device through the web UI from the control device, a first command from the control device through the first network under the first protocol, wherein the interaction comprises an event occurred at the first IoT device, and an action performed at the second IoT device triggered by the event at the first IoT device;

in response to the rule command, creating, by the gateway device, the interaction rule for the interaction between the first IoT device and the second IoT device based on the rule command;

receiving, by the gateway device, a signal from the first IoT device to indicate the event, and determine, based on the signal, that the event has occurred at the first IoT device;

in response to determining that the event has occurred at the first IoT device,
generating, by the gateway device, a triggering command based on the interaction rule for the interaction between the first IoT device and the second IoT device; and
sending, by the gateway device the triggering command to the second IoT device through the corresponding network under the corresponding protocol for the second IoT device to trigger the action at the second IoT device;

performing, by the gateway device, at least one discovery operation for available IoT devices;

in response to discovery of a new IoT device, generating, by the gateway device, an notification corresponding to the new IoT device being discovered, and sending the notification to the control device;

receiving, by the gateway device from the control device, an approval command to approve authentication of the new IoT device being discovered, or a rejection command to reject authentication of the new IoT device being discovered; and in response to receiving the approval command to approve authentication of the new IoT device being discovered, storing, by the gateway device, information of the corresponding API, the corresponding network and the corresponding protocol specific for the new IoT device being discovered in the data store as the configuration data of the new IoT device being discovered, and authenticating the new IoT device being discovered to become one of the authenticated IoT devices.

12. The method as claimed in claim 11, wherein
the configuration data of the first IoT device further comprises information of the event; and
the configuration data of the second IoT device further comprises information of the action.

13. The method as claimed in claim 12, wherein the gateway device is configured to receive the signal from the first IoT device, and determine, based on the signal, that the event has occurred at the first IoT device by:
receiving the signal from the first IoT device through the corresponding network under the corresponding protocol for the first IoT device;
retrieving the configuration data of the first IoT device;
selecting, based on the configuration data of the first IoT device, the corresponding API specific for the first IoT device; and
processing the signal using the corresponding API specific for the first IoT device to determine that the event has occurred at the first IoT device.

14. The method as claimed in claim 12, wherein the gateway device is configured to generate the trigger command by:
retrieving the interaction rule for the interaction between the first IoT device and the second IoT device;

determining, based on the interaction rule, the second IoT device;
retrieving the configuration data of the second IoT device;
selecting, based on the configuration data of the second IoT device, the corresponding API specific for the second IoT device, and determining the corresponding network and the corresponding protocol for the second IoT device; and
generating the triggering command using the corresponding API specific for the second IoT device based on the interaction rule.

15. The method as claimed in claim 12, wherein the control device is a mobile device storing an IoT control application which, when executed at a processor of the mobile device, is configured to:
request the web UI from the gateway device;
in response to receiving the web UI, display the information of the authenticated IoT devices through the web UI;
receive inputs corresponding to the first IoT device, the event occurred at the first IoT device, the second IoT device, and the action performed at the second IoT device;
generate the rule command based on the inputs; and
send the rule command to the gateway device.

16. The method as claimed in claim 15, wherein the web UI is a graphic UI (GUI), and each of the first IoT device, the event occurred at the first IoT device, the second IoT device, and the action performed at the second IoT device is displayed as an icon in the GUI.

17. A non-transitory computer readable medium storing computer executable code, wherein the computer executable code, when executed at a processor of a gateway device, is configured to:
provide a web user interface (UI) for a control device, wherein the gateway device is communicatively connected to the control device and a plurality of authenticated internet of things (IoT) devices through a corresponding network under a corresponding protocol, the authenticated IoT devices comprise a first IoT device and a second IoT device, and the web UI is configured to display information of the authenticated IoT devices at the control device, wherein the gateway device comprises a data store storing information of the control device, configuration data of the authenticated IoT devices, an interaction rule for an interaction between the first IoT device and the second IoT device, and a plurality of application program interfaces (APIs), and wherein for each of the authenticated IoT devices, a corresponding API specific for the authenticated IoT device is selected from the APIs, and the configuration data comprises information of the corresponding API, the corresponding network and the corresponding protocol specific for the authenticated IoT device;
receive, through the web UI from the control device, a rule command to define the interaction between the first IoT device and the second IoT device, wherein the interaction comprises an event occurred at the first IoT device, and an action performed at the second IoT device triggered by the event at the first IoT device;
in response to the rule command, create the interaction rule for the interaction between the first IoT device and the second IoT device based on the rule command;
receive a signal from the first IoT device to indicate the event, and determine, based on the signal, that the event has occurred at the first IoT device;

in response to determining that the event has occurred at the first IoT device,
    generate, based on the interaction rule for the interaction between the first IoT device and the second IoT device, a triggering command; and
    send the triggering command to the second IoT device through the corresponding network under the corresponding protocol for the second IoT device to trigger the action at the second IoT device;
perform at least one discovery operation for available IoT devices;
in response to discovery of a new IoT device, generate an notification corresponding to the new IoT device being discovered, and send the notification to the control device;
receive, from the control device, an approval command to approve authentication of the new IoT device being discovered, or a rejection command to reject authentication of the new IoT device being discovered; and
in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices.

18. The non-transitory computer readable medium as claimed in claim 17, wherein:
    the configuration data of the first IoT device further comprises information of the event;
    the configuration data of the second IoT device further comprises information of the action; and
    wherein the computer executable code further comprises:
        a UI module, configured to provide the web UI, and receive the rule command from the control device; and
        a processing module, configured to:
            create the interaction rule for the interaction between the first IoT device and the second IoT device based on the rule command, and store the interaction rule in the data store;
            receive the signal from the first IoT device, and determine, based on the signal, that the event has occurred at the first IoT device; and
            in response to determining that the event has occurred at the first IoT device, generate, based on the interaction rule for the interaction between the first IoT device and the second IoT device, the triggering command, and send the triggering command to the second IoT device through the corresponding network under the corresponding protocol for the second IoT device to trigger the action at the second IoT device.

19. The non-transitory computer readable medium as claimed in claim 18, wherein the processing module is configured to receive the signal from the first IoT device, and determine, based on the signal, that the event has occurred at the first IoT device by:
    receiving the signal from the first IoT device through the corresponding network under the corresponding protocol for the first IoT device;
    retrieving the configuration data of the first IoT device;
    selecting, based on the configuration data of the first IoT device, the corresponding API specific for the first IoT device; and
    processing the signal using the corresponding API specific for the first IoT device to determine that the event has occurred at the first IoT device.

20. The non-transitory computer readable medium as claimed in claim 18, wherein the processing module is configured to generate the trigger command by:
    retrieving the interaction rule for the interaction between the first IoT device and the second IoT device;
    determining, based on the interaction rule, the second IoT device;
    retrieving the configuration data of the second IoT device;
    selecting, based on the configuration data of the second IoT device, the corresponding API specific for the second IoT device, and determine the corresponding network and the corresponding protocol for the second IoT device; and
    generating the triggering command using the corresponding API specific for the second IoT device based on the interaction rule.

21. The non-transitory computer readable medium as claimed in claim 18, wherein the control device is a mobile device storing an IoT control application which, when executed at a processor of the mobile device, is configured to:
    request the web UI from the gateway device;
    in response to receiving the web UI, display the information of the authenticated IoT devices through the web UI;
    receive inputs corresponding to the first IoT device, the event occurred at the first IoT device, the second IoT device, and the action performed at the second IoT device;
    generate the rule command based on the inputs; and
    send the rule command to the gateway device.

22. The non-transitory computer readable medium as claimed in claim 21, wherein the web UI is a graphic UI (GUI), and each of the first IoT device, the event occurred at the first IoT device, the second IoT device, and the action performed at the second IoT device is displayed as an icon in the GUI.

23. The non-transitory computer readable medium as claimed in claim 17, wherein the gateway device further comprises a plurality of network interfaces, wherein each of the network interfaces is operational under one of the corresponding protocols for the control device and the authenticated IoT devices.

* * * * *